United States Patent
Miyamoto

(10) Patent No.: US 6,628,924 B1
(45) Date of Patent: Sep. 30, 2003

(54) CDMA MOBILE COMMUNICATIONS SYSTEM

(75) Inventor: Yukie Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/549,706

(22) Filed: Apr. 14, 2000

(30) Foreign Application Priority Data

Apr. 16, 1999 (JP) ............................................. 11-108801

(51) Int. Cl.[7] ................................................ H04B 7/00
(52) U.S. Cl. ........................ 455/69; 455/522; 455/67.1; 370/318; 370/320
(58) Field of Search ........................... 455/522, 69, 63, 455/67.1, 67.3, 67.6; 370/318, 320

(56) References Cited

U.S. PATENT DOCUMENTS

| | | | |
|---|---|---|---|
| 5,590,409 A | * 12/1996 | Sawahashi et al. | 455/69 |
| 5,839,056 A | * 11/1998 | Hakkinen | 455/69 |
| 5,995,496 A | * 11/1999 | Honkasalo et al. | 370/318 |
| 6,144,861 A | * 11/2000 | Sundelin et al. | 455/522 |
| 6,311,070 B1 | * 10/2001 | Tong et al. | 455/522 |
| 6,317,600 B1 | * 11/2001 | Salonaho et al. | 455/453 |
| 6,373,823 B1 | * 4/2002 | Chen et al. | 370/252 |
| 6,405,021 B1 | * 6/2002 | Hamabe | 455/69 |
| 6,411,817 B1 | * 6/2002 | Cheng et al. | 455/522 |
| 6,421,370 B1 | * 7/2002 | Yasaki | 375/141 |

FOREIGN PATENT DOCUMENTS

| | | |
|---|---|---|
| JP | 6-132872 | 5/1994 |
| JP | 6-276130 | 9/1994 |
| JP | 8-32514 | 2/1996 |
| JP | 8-116306 A | 5/1996 |
| JP | 2823034 | 9/1998 |
| JP | 10-233369 A | 12/1998 |

* cited by examiner

Primary Examiner—William Trost
Assistant Examiner—Sharad Rampuria
(74) Attorney, Agent, or Firm—Sughrue Mion, PLLC

(57) ABSTRACT

A method for controlling a reference SIR used for a closed loop control in a CDMA mobile communications system is disclosed. When an uplink channel has insufficient communication quality, the reference SIR is increased by a predetermined increase amount. When the uplink channel has sufficient communication quality, it is determined whether the base station is involved in the closed loop control. When the base station in involved in the closed loop control, the reference SIR in decreased by a predetermined first decrease amount. When the bane station is not involved in the closed loop control, the reference SIR is decreased by e predetermined second decrease amount which is greater than the predetermined first decrease amount.

15 Claims, 16 Drawing Sheets

CDMA MOBILE COMMUNICATIONS SYSTEM

BACKGROUND OF THE INVENTION

1. Field of the Invention

The present invention relates to a mobile communications system, and more particularly to a method for controlling a reference value for used in the closed loop control performed between a base station and a mobile station.

2. Description of Related Art

In a code division multiple access (hereinafter referred to as CDMA) mobile communications system, a service area is composed of a plurality of areas. The CDMA mobile communications system performs a two-way radio communication by means of CDMA transmission between a base transceiver station (hereinafter referred to as BTS) disposed at each area and a mobile station (hereinafter referred to as MS) located in an area.

In the CDMA transmission, a transmitting station performs modulation of a transmission signal before spreading the signal band to a wide band using a spreading code that is one of spreading codes that are perpendicular to each other and are previously assigned to every MS, and then transmission is performed. On the other hand, at a receiving station, the received wide-band signal is despread to an original narrow-band signal using the same spreading code before the narrow-band signal is demodulated. Thus, since the spreading codes allow identification of individual communication channels, the same frequency bands are used for all the channels in the CDMA mobile communications system. Further, in the CDMA mobile communications system, a plurality of BTSs can be connected to the MS at the same time. This causes smooth area switching in area boundaries by hand over processing, which is one of the advantages obtained in the CDNA mobile communications system.

On the other hand, in such a CDMA mobile communications system using the same frequency band and different spreading codes, a signal generated by a spreading code becomes a cause of interference noise for a signal generated by another spreading code. Thus, in order to realize the high sensitivity between the BTS and the MS while keeping the interference with other signals at the minimum level, the mutual transmission power control is employed using the signal to interference ratio (hereinafter referred to as SIR), which is defined as a ratio of the receiving power of a desired signal to the receiving power of another signal.

FIG. 1A shows an example of schematic configuration of a CDMA mobile communications system. The service area of this CDMA mobile communications system includes a plurality of areas, in which N base transceiver stations BTSs $10_1$ to $10_N$ are located, respectively, and are connected to a host station, which is a radio network controller (hereinafter referred to as RNC) 11 through network channels. Further, a mobile station (MS) 12 performs radio communication with a plurality of BTSs that are located in the network area by means of CDMA transmission. The MS 12 may be connected to a plurality of BTSs depending on its location and performs radio communication with the BTS having the highest sensitivity at that time. Such a state is defined as a diversity handover (hereinafter referred to as DHO) state.

The MS 12 performs the high-speed closed loop control with the BTS in charge for the purpose of transmission power control. In the description below, it is assumed that the MS 12 is connected to BTSs $10_1$ and $10_N$. The high-speed closed loop control is a transmission power control performed by an instruction of increase or decrease of transmission power to the opposed station between the MS 12 and each of the BTSs $10_1$ and $10_N$ when transmitting an uplink frame signal from the MS 12 to the BTSs $10_1$ and $10_N$ and when transmitting downlink frame signals from the BTSs $10_1$ and $10_N$ to the MS 12.

FIG. 1B shows a frame format of a signal transmitted between the MS and the BTSs. A frame signal 11 which is applicable to both uplink and downlink frame signals is composed of a plurality of slots $13_1$ to $13_N$. A transmitter power control (hereinafter referred to as TPC) signal 15 is positioned at the specific location of a predetermined slot 13, among the M slots. The TPC signal 15 is composed of, for example, 2 bits. When the TPC signal is "11", it indicates an instruction of increase in the transmission power and, when the signal is "00", it indicates an instruction of decrease in the transmission power.

Such a TPC signal is generated in a mobile station side or abase transceiver station side. Here in this case, it is assumed that the TPC signal is generated in BTS side. Such a BTS receives an uplink channel frame signal from the MS and compares the receiving SIR of this uplink signal with a predetermined referents SIR (hereinafter referred to as Sref) to perform the transmission power control far the MS. The reference SIR Brat is a predetermined reference value fox attaining a desired frame error rate allocated to every BTS. Hereafter, a frame error rate is referred to as FER.

More specifically, the BTS monitors an uplink frame signal received from a MB and, when receiving an uplink frame signal, measures SIR of the received uplink frame signal. If the measured SIR is not smaller than the reference SIR Sref, then it is determined that the received signal level is high enough to satisfy the desired FER. However, in the case where the transmission power of the MS is too great, it may cause interference to communications of other MSs located in the same area, resulting in deteriorated communication quality as a whole. Therefore, in the case of sufficiently high received signal level, the BTS generates the TPC signal instructing the MS to decrease in transmission power and adds it to the downlink frame signal. On the other hand, if the measured SIR is smaller than the reference SIR Sref, then the BTS generates the TPC signal instructing the MS to increase in transmission power and adds it to the downlink frame signal. When receiving the TPC signal from the MTS, the MS decreases or increases its transmission power depending on the received TPC bits.

Thus, in the CDMA mobile communications system, the transmission power of the MS is controlled from the opposite station (here, BTS) by adding the TPC signal generated based on the uplink frame signal to the downlink frame signal between the BTSs and MS. Such a control is called as a high-speed closed loop control.

Regarding the high-speed closed loop control, several controllers and control methods have been proposed. For example, "Mobile station transmission power controller" In Japanese Patent Unexamined Publication No. 6-132782 discloses a technique of maintaining communication quality depending on the distribution of mobile stations. More Specifically, BTS calculates an evaluated SIR value which is the difference between a local station SIR value and an average SIR value of overall service areas, and then compares the local station SIR value with the upper limit and lower limit threshold values, whereby a transmission power required to the opposite party is set to a value proportional to the SIR evaluated value based on the comparison result.

Further, "Transmission Power Control Method" in Japanese Patent Unexamined Publication No. 6-276130 discloses a technique in which d transmission power from the opposite party is set to a range which does not exceed predetermined upper limit value and lower limit value reflecting the updated amount ΔP which is the difference between the target SIR value and a local SIR value at the present time and the transmission power is controlled so that SIR values of the adjacent BTSs become the same level.

Further, "Transmission Power Control Method and Transmission Power Control Apparatus" in Japanese Patent Unexamined Publication No. 8-32514 discloses a technique in which a transmission power control is carried out by the above-mentioned high-speed closed loop control which can be usually performed with high accuracy and, when a change of surrounding propagation situation occurs such that a received power is rapidly increased, the optimized transmission power can be obtained for a short time by an open-loop control.

In the case of the DHO (diversity hand-over) state where the MS 12 is simultaneously connected to the plurality of BTSs $10_1$ through $10_N$ as shown in FIG. 1A, the TIC signal of the high-speed closed loop control is independently received from each of the plurality of BTSs. However, the MS 12 gives priority to the instruction of decrease in the transmission power and determines the transmission power for the uplink channel. Thus, the reference SIR Sref of each BTS which determines the transmission power of the MS is set to the minimum value which keeps interference with other channels at the minimum level and satisfies the desired communication quality.

However, a relationship between the required communication quality and the SIR varies due to fluctuated propagation properties resulting from a change of the moving speed of the MS itself and a change of the number of connected blanches and the like. When a predetermined reference SIR Sref is used, the required communication quality may not be satisfied or excess communication quality may be given. Accordingly, to correct the reference SIR Sref, an outer loop control is carried out.

The outer loop control is described in "Specifications of Air-interface for 3G Mobile System Ver 1.0"(Association of Radio Industries and Businesses: ARIB). The outer loop control of an uplink channel described in this paper causes the reference SIR Sref to be updated based on quality information at the BTS in order to satisfy the required communication quality focusing on the average FIR and the average bit error rate (BER). Although the updating algorithm of the outer loop control is applied to the downlink channel in the above-mentioned paper, the updating algorithm can be also applied to the uplink channel. That is, using the result of cyclic redundancy check (hereinafter referred to as CRC) of a frame signal in the uplink channel from the MS as quality information, the updating of the Sref is carried out based on this result.

FIG. 2A shows the outline of a sequence between an MS and a BTS in which the above-mentioned high-speed closed loop control and the outer loop control are performed. When a frame signal 25 on an uplink channel from the MS is first received at the BTS, the BTS measures an SIR of this uplink frame signal 25 (step 26). Further the BTS checks CRC result of the received uplink frame signal 25 and autonomously performs update of the reference SIR Sref at the BTS in accordance with the CRC result (step 27). In the case where the CRC result exhibits "NG" which indicates occurrence of error bits, the receiving level is often insufficient and therefore the reference SIR Sref is increased to cause the MS to increase in transmission power according to the high-speed closed loop control.

On the other hand, in the case where the CRC result exhibits "OK" which indicates no occurrence of error bit, the receiving level is often sufficient and therefore the reference SIR Sref is decreased to cause the MS to decrease in the transmission power by the high-speed closed loop control. By comparing the thus updated Sref by the outer loop control with the measured received SIR, the TPC signal is generated and transmitted to the MS using a downlink frame signal 28. By looking at the TPC signal contained in the received frame signals in the downlink channel, the MS increases or decreases in transmission power control.

FIG. 2B shows the outline of a control flow of Sref update processing in a BTS. The BTS monitors a received signal in frames on the uplink channel from the BS (Step S30). When the BTS receives one frame (YES at Step S30), CRC check is performed using the CRC bits contained at a predetermined location of the frame signal (Step S31). When no error occurs, that is, when the CRC result is "OK" (YES at Step S32), a SIRdec [dB] which is a predetermined decrease value is subtracted from the reference SIR Sref so that the Sref is updated to a decreased value (Step 33). On the other hand, when the CRC result is "NG" (NO at Step S32), a SIRinc [dB] which is a predetermined increase value is added to the reference SIR Sref so that the Sref is updated to an increased value (Step 34). As described above, when the CRC result is "OK", the bit error does not occur and the Sref is decreased so that the transmission power of the MS is not excessively set. And when the CRC result is "NG", the bit error occurs and the Sref is increased so that the transmission power of the MS is increased. Thus, a receiving level which satisfies the target communication quality can be obtained.

The above-described SIRdec and SIRinc have a relationship shown in the following equation:

SIRdec=SIRinc×FERtg/(1−FERtg) . . . (1), where FERtg is the required quality of FER.

FIG. 3 shows a time-varying reference SIR Sref in the case of the outer loop control on condition that the FERtg is set to 10% in the above equation (1). This means that an addition is performed by an amount of SIRinc 35 at a ratio of 10% and a subtraction by an amount of SIRdec 36 is performed at a ratio of the remaining 90%. In other words, there is a relationship such that when an addition is once performed by the SIRinc, the Sref is gradually decreased to the original low Sref by the subtraction with SIRdec at the remaining nine times. In the case where the SIRdec has the same value as the SIRinc regardless of such FERtg, when the FERtg is 10%, the Sref significantly becomes small by the subtraction of SIRdec. In general, the FERtg is 1% or less and the SIRdec becomes smaller than the SIRinc.

Regarding to such an outer loop control, "Transmission Power Control System for Mobile communications system" in Japanese Patent No. 283034 discloses a technique in which the number of times a received signal quality has been deteriorated is measured and when the deterioration count exceeds a specified value, the Sref is updated at regular steps.

As described above, in the CDMA communications system to which the above conventional outer loop control was applied, in the case of the DSO state where the MS and the plurality of BTSs are connected at the same time, an update operation of the Sref is performed by using the CRC results of uplink frame signals independently received by every BTS as described above. As a result, there is developed a problem such that variations in Sref occur among the plurality of BTSs connected to the MS in the DHO state. That is, the MS in the DHO state decreases in transmission power depending on an instruction received from a BTS having the most excellent propagation condition according to the high-speed closed loop control as disclosed in Japanese Patent Unexamined Publication No. 6-132872, 6-276130 or 6-32514. Therefore, there is a high possibility that a receiving SIR does not reach the reference SIR Sref in the BTS which is not involved in this high-speed closed loop control (hereinafter referred to as BTS_n). In such a case, the BTS_n is controlled so that the Sref is increased by the outer loop control. In general, a plurality of BTSS connected to the Ms, which is in the DHO state, have large differences in propagation conditions, respectively. Accordingly. there is a high possibility that a specific BTS alone can be kept contributing to the high-speed closed loop control for a long time. Therefore, at the BTS_n, an update operation by the increase of the Sref is repeated, and the Sref is rapidly increased. As a result, when a comparison of the BTS which contributed to the high-speed closed loop control and the BTS_n which did not contribute thereto is made, large differences between the respective Srefs occur.

If the MS approaches the BTS_n which is in a state where the Sref is excessively increased, then the Sref is first decreased by such an outer loop control disclosed in, for example. Japanese Patent No. 2823034. However, since the SIRdec is smaller than the SIRinc as described above, a long time is needed until the Sref, which was excessively increased, is decreased to an appropriate value. Since the BTS_n requires an excess transmission power from the MS for the long time, although the BTS_n is a BTS having the most excellent propagation condition, the high-speed closed loop control contributes to another BTS. Accordingly, frame signals are transmitted from the MS with an excess transmission power. This excess transmission power increases the interference power for the surrounding other MSs, resulting in deterioration of transmission quality in an overall service area. Further, in the case where the BTS connected to the MS is only the BTS_n in a state that the Sref is excessively increased, the high-speed closed control is performed with the excess Sref of the BTS_n, whereby the interference power for the surrounding other MSs is also increased and deterioration of the transmission quality in an overall service area occurs.

SUMMARY OF THE INVENTION

The above-described disadvantages are caused by the fact that it cannot be determined which of the BTSs does not contribute to the high-speed closed loop control in the DHO state. As a result, the transmission quality in an overall service area is deteriorated.

Accordingly, an object of the present invention is to provide a CDNA mobile communications system which can determine which of the base transceiver stations BTSs does not contribute to the high-speed closed loop control in the DHO state.

Another object of the present invention is to provide a CDMA mobile communications system allowing the deterioration of communication quality to be suppressed even though variations in reference SIR Sref occur from BTS to BTS.

Still another object of the present invention is to provide a CDMA mobile communications system that can minimize variations in reference SIR Sref from BTS to BTS to achieve the stable quality of communication, According to the present invention, it can be determined which of BTSs does not contribute to a high-speed closed loop control in the DHO state. Further, an appropriate reference SIR Sref can be set for a short period even if there is a wide range of variations in Srefs among BTSs, whereby deterioration of the communication quality due to an excess transmission power of a mobile station can be decreased. Further, the difference among Srefs of BTSs can be minimized to keep the communication quality.

According to a first aspect of the present invention, a method for controlling a first reference SIR (Signal-to-Interference power Ratio) which is used as a reference of a closed loop control by a first radio station to control transmission power of a second radio station connected to the first radio station by radio in a mobile communications system, includes the steps of: a) determining whether a first radio channel used to communicate with the second radio station has sufficient communication quality; b) when the first radio channel has insufficient communication quality. Increasing the first reference SIR by a predetermined increase amount; c) when the first radio channel has sufficient communication quality, determining whether the first radio station is involved in the closed loop control controlling transmission power of the second radio station; d) when the first radio station is involved in the closed loop control, decreasing the first reference SIR by a predetermined first decrease amount; and e) when the first radio station is not involved in the closed loop control, decreasing the first reference SIR by a predetermined second decrease amount which is greater than the predetermined first decrease amount.

The step (c) preferably includes the steps of: c.1) detecting an increase amount of the first reference SIR over a past time period from a current time point within a predetermined time period; c.2) determining whether the increase amount of the first reference SIR is smaller than a predetermined thresholds c.3) when the increase amount of the first reference SIR is smaller than the predetermined threshold, determining that the first radio station is involved in the closed loop control; and c.4) when the increase amount of the first reference SIR is not smaller than the predetermined threshold, determining that the first radio station is not involved in the closed loop control.

Further, the step (e) may includes the steps of: counting the number of times the reference SIR is increased at the step (a) to produce an increase count; when the increase count for the predetermined time period is smaller than a predetermined count threshold, determining that the first radio station is involved in the closed loop control; and when the increase count for the predetermined time period is not smaller than a predetermined count threshold, performing the step (c.1)

According to a second aspect of the present invention, at the Second radio station, the following steps are preferably performed: f) determining whether a second radio channel used to communicate with the first radio station has sufficient communication quality: g) when the second radio channel has insufficient communication quality, increasing a second reference SIR by a predetermined increase amount, wherein the second reference SIR is used as a reference of the closed loop control by the second radio station to control transmission power of the first radio station; h) when the radio channel has sufficient communication quality, decreasing the second reference SIR by a predetermined decrease amount: and i) when the second reference SIR has been increased at the stay (g), sending a reference increase notification to the first radio station. In this case, the step (c) preferably includes the steps of: c.1) counting the number of times the reference increase notification has been received from the second radio station for a predetermined time period, to produce a notification count) c.2) when the notification count is not smaller than a predetermined count threshold, determining that the first radio station is involved in the closed loop control; and c.3) when the notification count is smaller than the predetermined count threshold, determining that the first radio station is not involved in the closed loop control.

According to a third aspect of the present invention, a method includes the steps of: a) determining whether a radio channel used to communicate with the second radio station has sufficient communication quality; b) when the first radio channel has sufficient communication quality, decreasing the reference SIR by a predetermined decrease amount: c) when the first radio channel has insufficient communication quality, determining whether the first radio station is involved in the closed loop control controlling transmission power of the second radio station: d) when the first radio station is involved in the closed loop control, increasing the reference SIR by a predetermined increase amount; and e) when the first radio station is not involved in the closed loop control, causing the reference SIR not to be changed.

The step (c) may include the steps of: c.1) calculating an average reference mover a predetermined past time period from a current time point; c.2) calculating an average receiving SIR over the predetermined past time period by averaging SIRS of signals received for the predetermined past time period; c.3) determining whether a SIR difference between the average reference SIR and the average receiving SIR is smaller than a predetermined threshold; c.1) when the SIR difference is smaller than the predetermined threshold determining that the first radio station is involved in the closed loop control; and e.3) when the SIR difference is not smaller than the predetermined threshold, determining that the first radio station is not involved in the closed loop control, According to a fourth aspect of the present invention, in a mobile communications system composed of a plurality of base transceiver stations and a plurality of mobile stations, a method for controlling a first reference SIR (Signal-to-Interference power Ratio) which is used as a reference of a closed loop control by a base transceiver station to control transmission power of a mobile station connected to a plurality of bass transceiver stations, includes the steps of:

at the mobile station, a) measuring a second receiving SIR by receiving a broadcasting signal from each of the base transceiver stations connected to the mobile station; b) finding a first bass transceiver station having a maximum second receiving SIR among the base transceiver stations connected to the mobile station; c) selecting a second base transceiver station such that a SIR difference between the maximum second receiving SIR and a second receiving SIR of the second base transceiver station is not smaller than a predetermined SIR difference threshold; d) sending a notification including an identification of the second base transceiver station to the base transceiver stations connected to the mobile station;

at each of the base transceiver stations connected to the mobile station, e) determining whether the identification included in the notification received from the mobile station is identical to an identification assigned thereto; f) when the identification included in the notification is identical to the identification of its own, determining whether a radio channel used to communicate with the mobile station has sufficient Communication quality; g) when the radio channel has sufficient communication quality, decreasing the first reference SIR by a predetermined decrease amount; h) when the radio channel hag insufficient communication quality, determining whether the base transceiver station is involved in the closed loop control controlling transmission power of the mobile station, based on the number of times the notification has been received from the mobile station for a predetermined time period; i) when the base transceiver station is involved in the closed loop control, increasing the first reference SIR by a predetermined increase amount; and j) when the base transceiver station is not involved in the closed loop control, causing the first reference SIR not to be changed, According to a fifth aspect of the present invention, in a mobile communications system composed of a network controller, a plurality of base transceiver stations connected to the network controller, and a plurality of mobile stations, a method for controlling a reference SIR (Signal-to-Interference power Ratio) which is used as a reference of a closed loop control by a base transceiver station to control transmission power of a mobile station connected to a plurality of base transceiver stations, includes the steps of:

at the network controller, a) receiving a frame of data received by each of the base transceiver stations from the mobile station; b) selecting a frame of data having best condition among a plurality of frames of data received by the base transceiver stations; c) counting the number of times a frame of data having best condition has not been selected for a predetermined time period to produce a non-selection count for each of the base transceiver stations; d) selecting a first base transceiver station having a non-selection count which is not smaller than a predetermined count threshold; and e) sending a non-selection notification to the first base transceiver station;

at each of the base transceiver stations connected to the mobile station, f) determining whether the non-selection notification is received from the network controller; g) determining whether a radio channel used to communicate with the mobile station has sufficient communication quality; h) when the radio channel has sufficient communication quality, decreasing the reference SIR by a predetermined decrease amount; i) when the radio channel has insufficient communication quality, determining whether the base transceiver station is involved in the closed loop control controlling transmission power of the mobile station, depending on whether the non-selection notification has been received from the network controller: j) when the base transceiver station is involved in the closed loop control, increasing the first reference SIR by a predetermined increase amount; and k) when the base transceiver station is not involved in the closed loop control, causing the first reference SIR not to be changed.

According to a sixth aspect of the present invention, in a mobile communications system composed of a network controller, a plurality of base transceiver stations connected to the network controller, and a plurality of mobile stations, a method for controlling a reference SIR (Signal-to-Interference power Ratio) which is used as a reference of a closed loop control by a base transceiver station to control transmission power of a mobile station, includes the steps of:

at the network controller, a) inquiring the reference SIR from each of the plurality of base transceiver stations; b) selecting a minimum reference SIR among a plurality of reference SIRS received from the bass transceiver stations; c) sending the minimum reference SIR to the bass transceiver stations;

at each of the bass transceiver stations receiving the minimum reference SIR from the network controller, d) replacing a current reference SIR with the minimum reference SIR received from the network controller.

DESCRIPTION OF THE PREFERRED EMBODIMENTS

First Embodiment

Figure 1A:
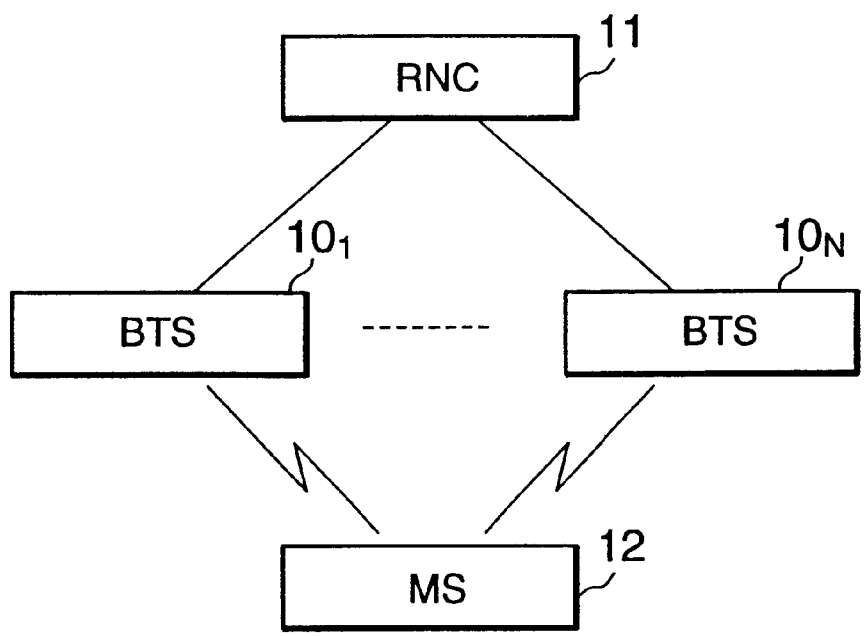
FIG. 1A is a schematic view showing the configuration of a conventional CDMA mobile communications system.
Figure 1B:
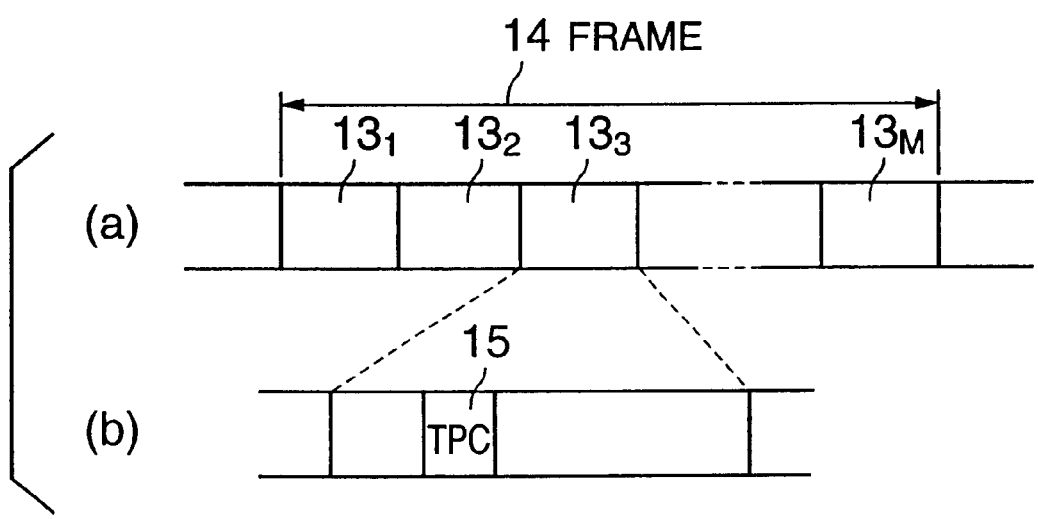
FIG. 1B is an explanatory view showing a format of a frame signal transmitted and received between conventional MS and BTS.
Figure 2A:
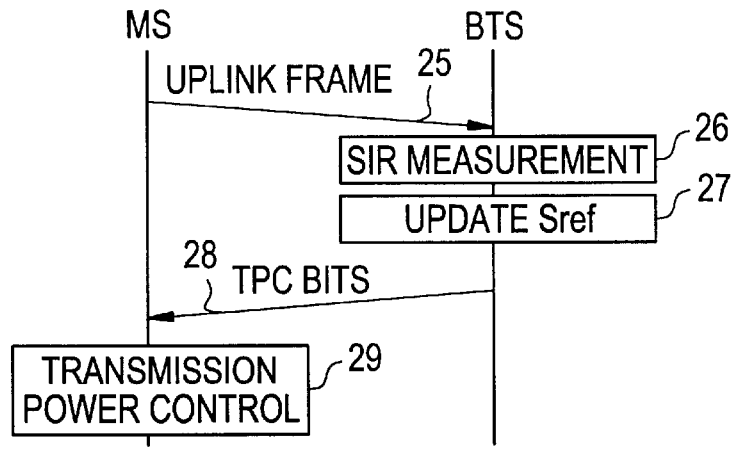
FIG. 2A is a diagram showing a sequence between MS and BTS in which the high-speed closed loop control and outer loop control are carried out.
Figure 2B:
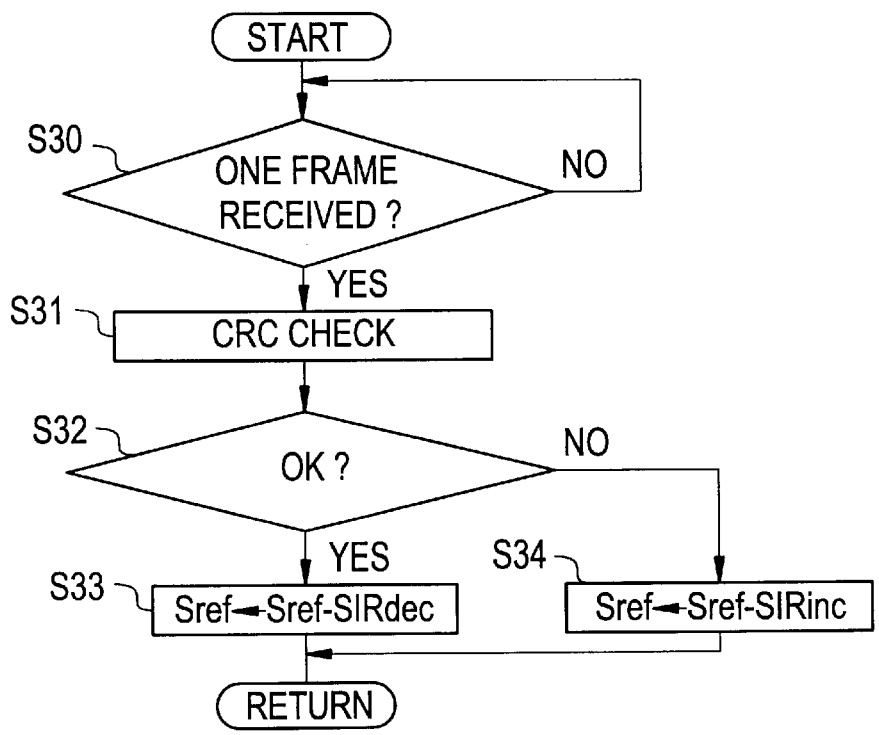
FIG. 2B is a flow chart showing the Sref update processing in a conventional BTS.
Figure 3:
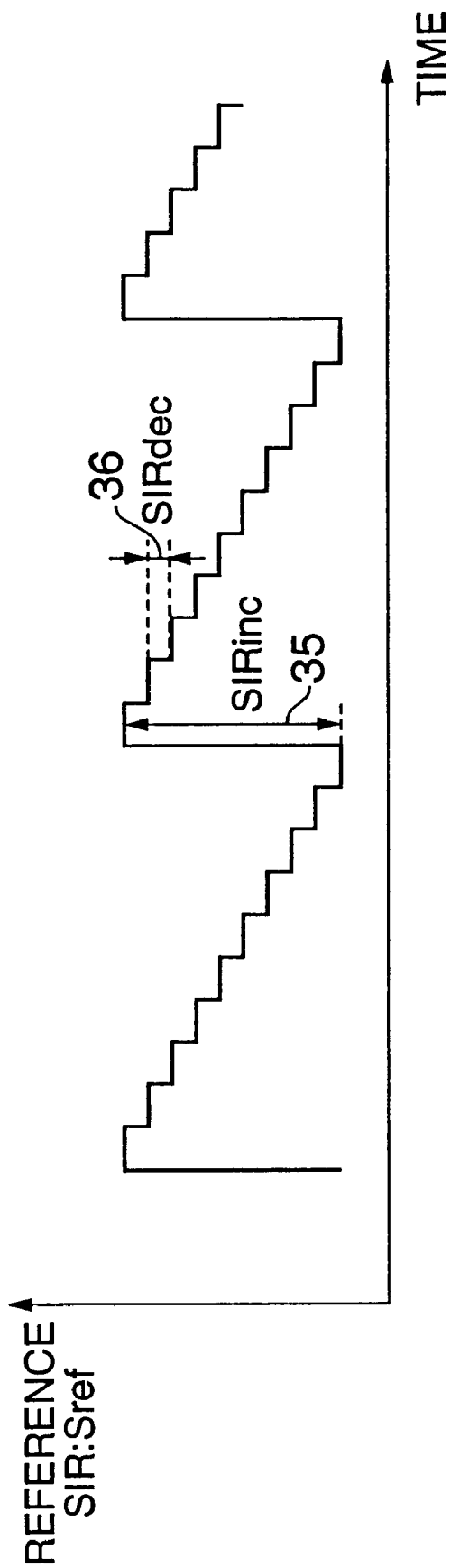
FIG. 3 is a diagram showing an appearance of time-varying Sref by an outer loop control.
Figure 4:
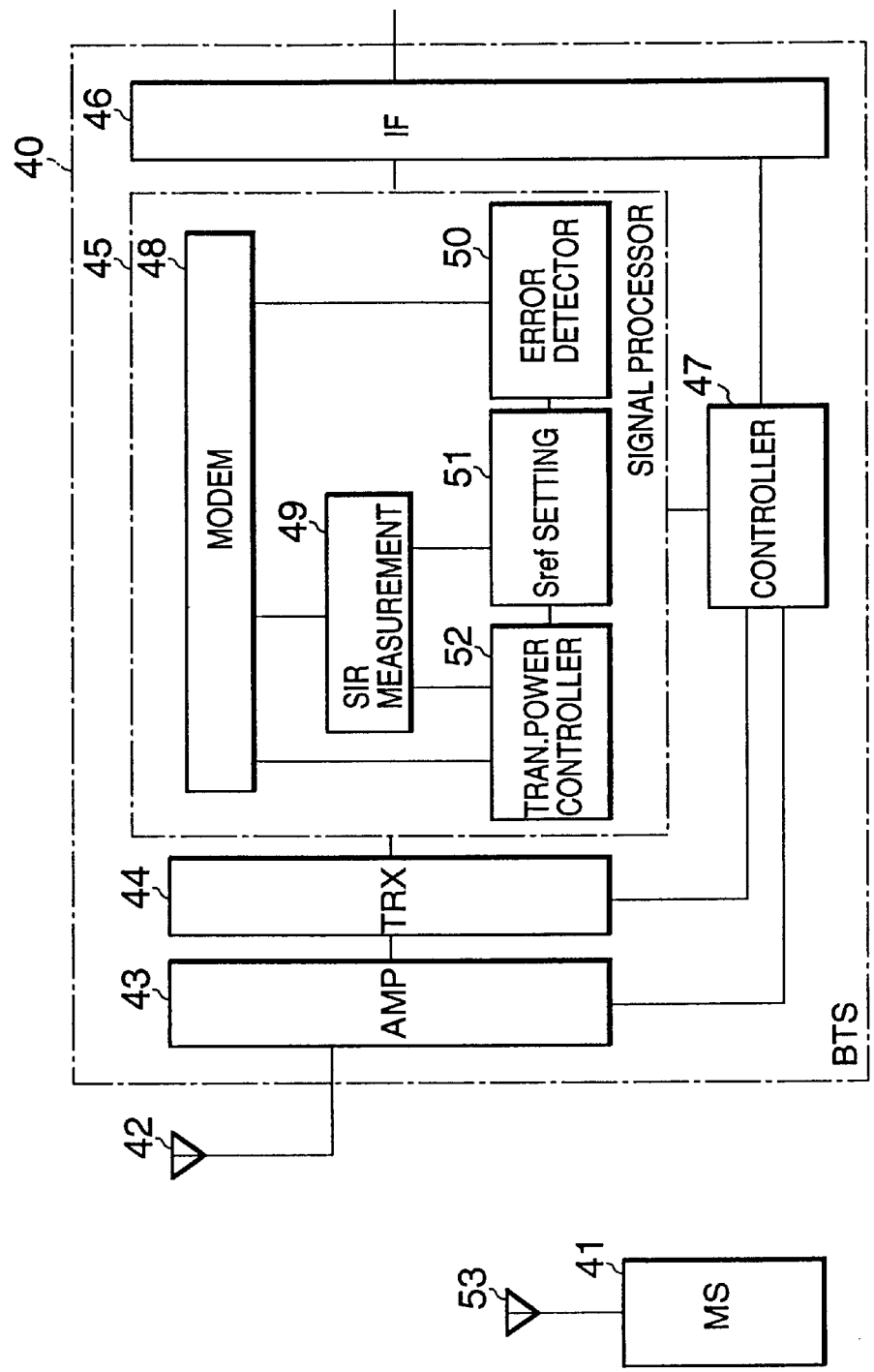
FIG. 4 is a block diagram showing the configuration of a CDMA mobile communications system according to a first embodiment of the present invention.

Referring to FIG. 4, a service area in a CDMA communications system is composed of a plurality of areas, each of which is formed by a base transceiver station (BTS). It is assumed that a mobile station (MS) 41 is located in a radio area formed by the BTS 40. Two-way radio communication by CDNA transmission can be performed between the DIE 40 and the MS 41. The BTS 40 is connected to a radio network controller RNC (not shown) through the network channel.

The BTS 40 is mainly provided with an antenna 42, an amplifier (AMP) 43, a radio transceiver (TRX) 44, a signal processor 45, and an interface (IF) 46. The antenna 42 transmits and receives uplink and downlink radio frame signals, to and from the MS 41. The AMP 43 is a power amplifier which amplifies a radio signal transmitted between the MS 41 and the antenna 42. The TRX 44 is provided between the AMP 43 and the signal processor 45 to perform frequency conversion.

The signal processor 45 performs transmission and reception signal processing and, in the present embodiment, it manages the high-speed closed loop control which controls the transmission power of a transmission signal based on a measurement of the receiving SIR and the outer loop control which updates the reference SIR Sref through examining received CRC signals. The IF 46 provides an interface to the RNC as a host station. Further, the BTS 40 Is provided with a Controller 47 which controls the AMP 43, the TRX 44, the signal processor 45, and the IF 46 to provide the call processing function and the state control function thereof.

The signal processor 45 includes a modulator/demodulator (modem) 45 which performs baseband processing including error correcting coding of transmission data, data modulation as primary modulation, spreading modulation as secondary modulation, synchronous processing for received data, despreading demodulation, and data demodulation. Further, the signal processor 45 includes a SIR measuring section 49 that measures the SIR of a received signal demodulated by the modem 48, an error detecting section 50 that detects errors of the demodulated signal, a reference value setting section 51 that sets a reference SIR Sref based on a measurement of the receiving SIR and a detected result of the error detecting section 50, and a transmission power controller 52 that generates TPC bits for performing the transmission power control for the MS 41 based on the measurement of the receiving SIR and the reference SIR Sref met by the reference value setting section 51.

The MS 41 is provided with an antenna 53 which is used to transmit/receive uplink/downlink radio frame signals to/from the BTS 40. The MS 41, as known well, has a function of controlling the transmission power of an uplink frame signal transmitted through the uplink channel depending on a value of TPC bits contained in the downlink frame signal received from the BTS 40 through the downlink channel. The high-speed closed loop control of the MS 41 is the same as described before and the description thereof is omitted.

In the BTS 40 of the CDNA mobile communications system configured like this, the SIR measuring section 49 measures the receiving SIR for the uplink frame signal received from the MS 41. On the other hand, in the error detecting section 50, the CAC check is performed for the baseband-processed received signal, and its result is notified to the reference value setting section 51. In the reference value setting section 51, if the CRC result inputted from the error detecting section 50 is no-good or "NG", the reference SIR Sref is increased and the number of times the Sref has been increased is memorized.

On the other hand, if the CRC result inputted from the error detecting section 50 is good or "OK", the reference value setting section 51 determines whether the reference SIR Sref is rapidly increased within a predetermined time period Tm [sec]. More specifically, a first-time difference between the receiving. SIR and the Sref obtained when the Sref has been increased for the first time within the predetermined time period Tm is compared with a present-time difference between the receiving SIR and the Sref at the present time. In the case where the present-time difference is greater than the first-time difference by a predetermined amount or more, it is determined that the Sref is rapidly increased. Thus, if it is determined that the Sref is rapidly increased, the Sref is decreased by a relatively large step. On the other hand, if it is determined that the Sref is not rapidly increased, the Sref is decreased by a relatively small step. By using the Star updated by such an outer loop control and the receiving SIR measured by the SIR measuring section 49, the transmission power controller 52 generates a TPC signal (here, 2-bit signal as described before) that is used to instruct the MS 41 to increase/decrease in the transmission power thereof.

The controller 47 of the BTS 40, which enables such control, has a program-controlled processor such as a central processing unit (CPU) therein and is configured so that various controls can be implemented by running programs thereon. The programs are stored in a predetermined memory such as a magnetic disk or a read-only memory (ROM) which may be independently provided.

Figure 5:
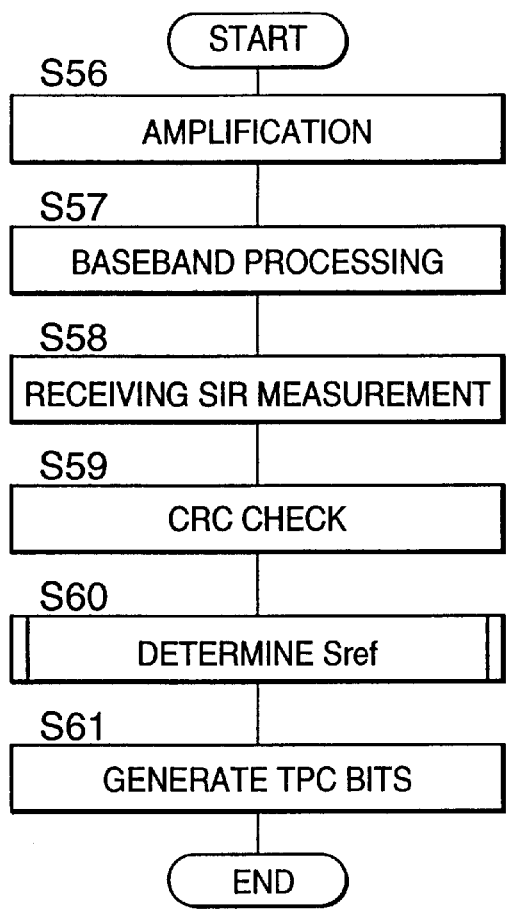
FIG. 5 is a flow chart showing an uplink-frame reception processing procedure performed by a controller of a BTS according to the first embodiment.

Referring to FIG. 5, the controller 47 of the BTS 40 performs the uplink channel signal processing by running a program stored in the above memory. The controller 47 of the BTS 40 controls the AMP 43 to power-amplify an uplink frame signal received from the MS 40 through the antenna 42 (Step S54). Thereafter, the TRX 44 performs frequency conversion to convert the received uplink frame signal into a baseband signal. The modem 48 of the signal processor 45 performs the above-described baseband processing (Step S57).

Thereafter, the SIR measuring section 49 measures the receiving SIR of the received baseband signal (Step S58) and then the error detecting section 50 performs the CAC check (Step 59). Then the Sref to be used in the high-speed closed loop control for the uplink channel is determined by the reference value setting section 51 based on the CRC result inputted from the error detecting section 50 and the receiving SIR inputted from the SIR measuring section 49 (Step S60).

After that, TPC bits are generated from the Sref inputted from the reference value setting section 51 and the receiving SIR measured by the SIR measuring section 49 at the transmission power controller 52 (Step S61). More specifically, when it is determined that the receiving SIR is equal to or greater than the Sref, the TPC bits "00" instructing a decrease of the transmission power of the MS 41 is generated. On the contrary, when it is determined that the receiving SIR Is smaller than the Sref, the TPC bits "11" instructing an increase of the transmission power of the MS 41 is generated. Thereafter, a received frame signal on the uplink channel is monitored again.

Figure 6:
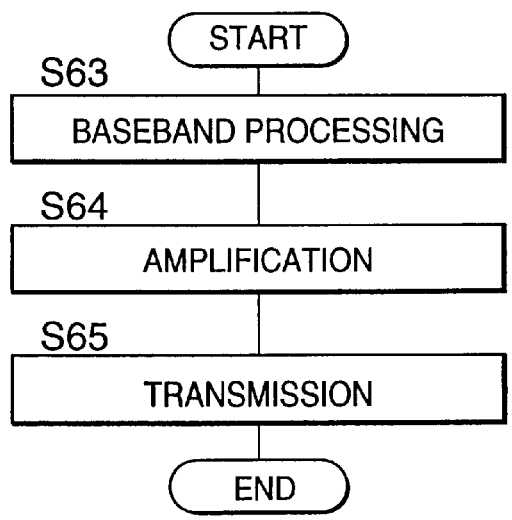
FIG. 6 is a flow chart showing a downlink-frame transmission processing procedure performed by the controller of the BTS according to the first embodiment.

Referring to FIG. 6, when the TPC bits generated at step S61 of FIG. 5 is requested to be transmitted using a downlink channel frame signal by the transmission power controller 52, for example, the controller 47 adds the TPC bits generated to the downlink channel frame signal and allows the modem 48 to perform the transmission baseband processing (Step S63). And after the frequency conversion by the TRX 44, power amplification is performed by the AMR 43 (Step S64) and transmission is made from the antenna 42 (Step S65) and thereby to finish a series of TPC generation and transmission processing.

Figure 7:
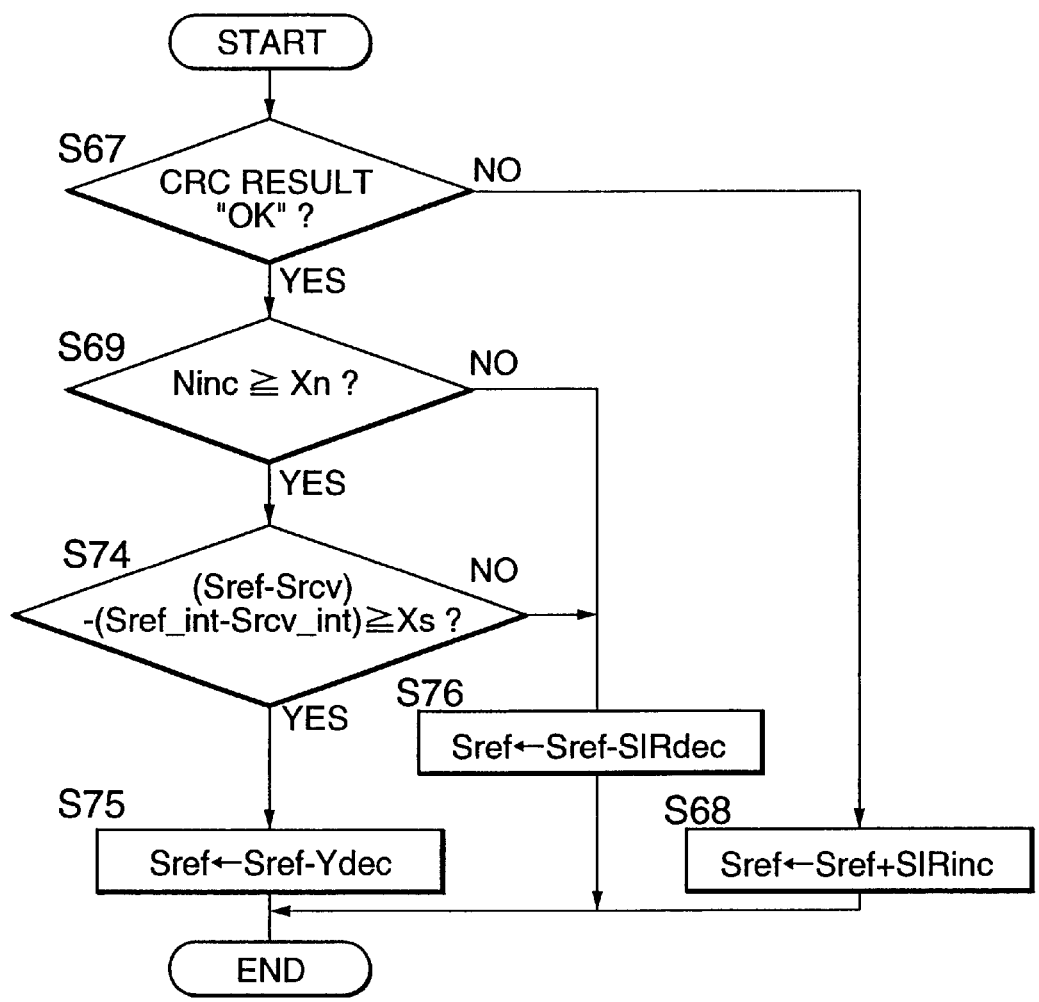
FIG. 7 is a flow chart showing a Sref updating procedure according to the first embodiment.

FIG. 7 shows the procedure of Sref updating at the step S60 of FIG. 5. The reference value setting section 51 monitors the reference SIR Sref and additionally counts the number of times the Sref has been increased for the past predetermined time period Tm [sec], which is hereafter denoted by Ninc. Further, the reference value setting section 51 holds both an initial reference SIR (hereafter, referred to as Sref-int) and an initially received SIR (hereinafter referred to as Srcv-int), which are obtained when Ninc=1, i.e., the first increased Sref in the past predetermined time period Tm [sec].

Referring to FIG. 7, in the reference value setting section 51, when the CRC result inputted from the error detecting section 50 is "NG" (NO at Step S67), the Sref is increased to improve the uplink communication quality by increasing the transmission power of the MS 41 as described in the prior art. That is, the Sref is updated by adding only the predetermined SIRinc [dB] to the Sref as shown in the following expression (2) (Step S68) and thereby to finish the update processing of the Sref.

$$Sref = Sref + SIRinc \, [dB] \tag{2}$$

Hereafter, SIRdec and SIRinc used in the updating procedure of Sref are predetermined values for attaining the desired FER based on the target value FERtg of FER as shown in the equation (1).

On the other hand, when the CRC result at step S67 is "OK" (YES at Step S67), according to the prior art as described before, the Sref is decreased to reduce the transmission power of the MS and thereby the interference power due to an excess transmission power is decreased. In the first embodiment of the present invention, however, it is determined whether the Sref is rapidly increased or not, based on the increment count Ninc previously counted as the number of times the Sref has been increased for the predetermined time period Tm sec, the difference between the Sref-int and the Srcv-int within the past predetermined time period Tm sec, and the difference between the Sref and the Srcv at this point of time. And when it is determined that the Sref is rapidly increased, Ydec [dB] which is a larger value than the SIRdec [dB] is subtracted from the Sref. When it is determined that the Sref is not rapidly increased, the SIRdec [dB] is subtracted from the Sref as described in the prior art.

More specifically, if a CRC result at step S67 is "OK", the increment count Ninc of Sref within the past predetermined time period Tm sec is compared with a predetermined upper limit of increment count, Xn (Step S68). Since the increment count Ninc of Sref in an ideal environment where the receiving quality is stable can be presumed in advance, it is possible to judge that the rapid increase of Sref occurred when the Sref has been increased Xn times or more for the predetermined time period Tm [sec].

However, the rapid increase of Sref may be caused by the following two. First, the desired FER and SIR are rapidly and significantly changed by fluctuations of propagation conditions and changes in the connected BTS number. Second, the MS 41 is connected in the DHO state and the relevant BTS 40 does not contribute to the high-speed closed loop control in the uplink channel. In the former case, the rapid increase in Sref is the result of a normal control performed for satisfying the required FER. On the other hand, the latter case is the result of unnecessary processing for increase, which also means that the Sref is set at an excessive value. Now the increase phenomenon of Sref in the DHO state will be described.

Figure 8:
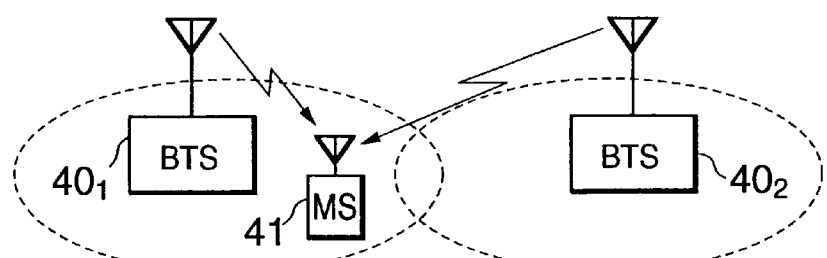
FIG. 8 is an explanatory view of a CDMA mobile communications system for explaining a phenomenon of the increase in Sref in the DH0 state.

As shown in FIG. 8, the MS 41 is connected to both BTSs $40_1$ and $40_2$ located at different areas from each other. In this case, it is assumed that the BTS $40_1$ is closer to the MS 41 than the BTS $40_2$ and the radio wave from the BTS $40_1$ reaches the MS 41 at a stronger level than from the BTS $40_2$. Since the MS 41 in the DHO state determines the transmission power depending on the TPC bits from a BTS having excellent propagation condition, the MS 41 shown in FIG. 8 determines the transmission power depending on transmission control from the BTS $40_1$. For example, even if an increase in the transmission power is required from the BTS $40_2$ to the MS 41, when the required communication quality is satisfied at the BTS $40_1$, the BTS $40_1$ requires an decrease in the transmission power for the MS 41. In this case, the MS 41 controls the transmission power so as to precede the requirement of decrease in the transmission power from the BTS $40_1$. As a result, the receiving SIR of the BTS $40_2$ becomes lower than the Sref. Thus, the CRC result becomes "NG" and the Sref set in the BTS $40_2$ is increased by an outer loop control. Therefore, the difference of propagation conditions between the BTS $40_1$ and the BTS $40_2$ becomes large. Thus, when a state where a BTS that contributes to the high-speed closed loop control is the BTS $40_1$ is continued, the Sref of the BTS $40_2$ is rapidly increased. In such cases, if the Sref of the BTS $40_1$ is also increased, there is no problem. However, if only the Sref of the BTS $40_2$ is increased without increasing the Sref of the BTS $40_1$, this increase is unnecessary processing, whereby the Sref is set to an excess value.

According to the first embodiment, to determine the BTS whose Sref is rapidly increased and which does not contribute to the high-speed closed loop control, a difference between "Sref–Srcv" and "Sref_int–Srcv_int" is checked. Now, the principle of determining such a BTS will be described.

Figure 9:
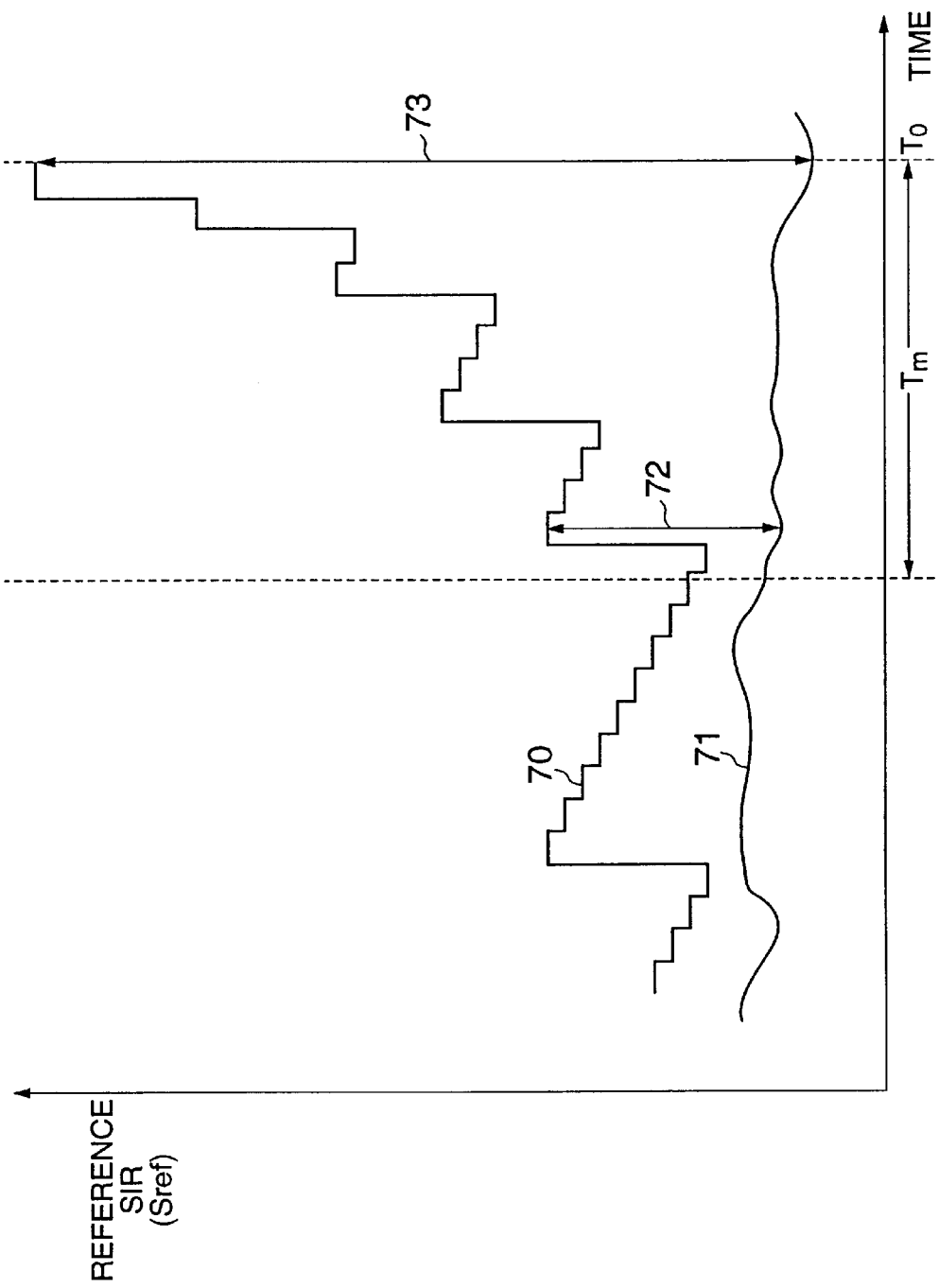
FIG. 9 is a diagram showing a time-varying reference SIR Sref for explaining principles of rapidly increasing the Sref and determining the BTS that does not contribute to the high-speed closed loop control.

In FIG. 9, the time-varying Sref 70 in the BTS to be updated by the outer loop control and the time-varying receiving SIR 71 are shown on the time axis. As mentioned above, the initially increased Sref-int and the initially received SIR Srcv-int are held for the past predetermined time period Tm sec from this point $T_0$ in time. The difference "Sref_int–Srcv_int" is a section shown by a difference 72. The difference "Sref–Srcv" at the present time $T_0$ is a section shown by a difference 73. Thus, when the BTS $40_2$ hardly contributes to the high-speed closed loop control and only the Sref of the BTS $40_2$ is rapidly increased for the past predetermined time period Tm sec, the difference between the Sref and the receiving SIR Is increased.

Therefore, if the difference "Sref–Srcv" between the Sref and the receiving SIR at this point in time is larger than the difference "Sref_int–Srcv_int" obtained when the Sref is first increased within the predetermined time period Tm Sec by a predetermined value Xs or more, than it is necessary to control such that the Sref is rapidly decreased by increasing the amount of a decrease of Sref on the update.

Turning to FIG. 7, if the increment count Ninc of Sref within the required term Tm sec at step S69 is equal to or greater than the predetermined value Xn, thereby determining that the possibility of rapid increase in Sref is developed (YES at Step S69), then it is checked whether the difference between "Sref–Srcv" and "Sref_int–Srcv_int" is equal to or greater than the predetermined value Xs to determine the BTS whose Sref is rapidly increased and which does not contribute to the high-speed closed loop control (Step S74). Now if it is determined that the difference between "Sref–Srcv" and "Sref_int–Srcv_int" is equal to or greater than the predetermined value Xs (YES at Step 74), then the BTS is determined to be that Sref is rapidly increased and the BTS does not contribute to the high-speed closed loop control as shown in FIG. 9. After that, by using the value Ydec larger than SIRdec, the Sref is updated as shown by an expression (3) as shown below (Step S75) and the processing is finished. Thus, the Sref which is excessively increased is decreased to an appropriate value as fast as possible.

$$Sref = Sref - Ydec \ [dB] \quad (3)$$

On the other hand, if the increment count Ninc of Sref within the required term Tm sec is smaller than the required value Xn (NO at Step S69), then it is not determined that Sref is rapidly increased. Therefore, the Sref is updated as shown by the following equation (4) similar to the conventional case (Step S76) and the processing is finished.

$$Sref = Sref - SIRdec \ [dB] \quad (4)$$

Further, in the case where, although the increment count Ninc is equal to or greater than the required value Xn, the difference between "Sref–Srcv" and "Sref_int–Srcv_int" is smaller than the required value Xn (YES at Step S69 and NO at Step S74), it is determined that the Sref was rapidly increased by significant changes of the relationship between the required FER and the required SIR due to deterioration of propagation conditions. Then, subtraction by SIRdec is made as shown in the equation (4) as in the conventional case (Step S76).

As described above, in the CDMA mobile communications system according to the first embodiment, the outer loop control corrects the Sref which is used for the high-speed closed loop control controlling the transmission power of the BS. In other words, if the CRC result of the receiving signal is "NG" at the reference value setting section 51, then addition is made by the predetermined SIRinc to update the Sref. On the other hand, if the CRC result is "OK", the Sref is decreased as described above.

In particular, in the BTS according to the first embodiment, the number of times (Ninc) the Sref has been increased within the past predetermined time period Tm sec from this point in time is counted and, at the same time, an Sref obtained when the Ninc=1, that is, when first added within the past predetermined time period Tm sec is held as the Sref_int and a receiving SIR at that time is held as the Srcv_int. And if the CRC result is "OK", that is, if the Ninc is equal to or greater than the predetermined Xn and the difference between "Sref−Srcv" and "Sref_int−Srcv_int" is equal to or greater than the required value Xs, then it is determined that the Sref is rapidly increased and the BTS of interest does not contribute to the high-speed closed loop control, whereby subtraction is made by Ydec which is a value larger than the SIRdec to update the Sref. Further, even if the CRC result is "OK", when the Ninc is equal to or greater than the predetermined Xn and the difference between "Sref−Srcv" and "Sref_int−Srcv_int" is smaller than the required value Xs, or when the Ninc is smaller than the predetermined Xn, it is determined that the relationship between the required FER and the SIR were significantly changed by deterioration of propagation condition and the like, or that the Sref was not rapidly increased, whereby update of the Sref by subtraction of SIRdec is performed.

Accordingly, in the case of variations in SIR from BTS to BTS, even if the MS moves to in the vicinity of the BTS whose Sref is rapidly increased and which does not contribute to the high-speed closed loop control, requirement for an excess transmission power of the MS can be avoided. As a result, the interference in uplink channels can be reduced.

Second Embodiment

In the CDMA mobile communications system of the first embodiment as described above, the update of Sref is performed by using the receiving signal CRC result in an uplink channel. In a CDMA mobile communications system of the second embodiment which will be described hereafter, the update of Sref is performed by using reference SIR information for the high-speed closed loop control in a downlink channel.

Figure 10:
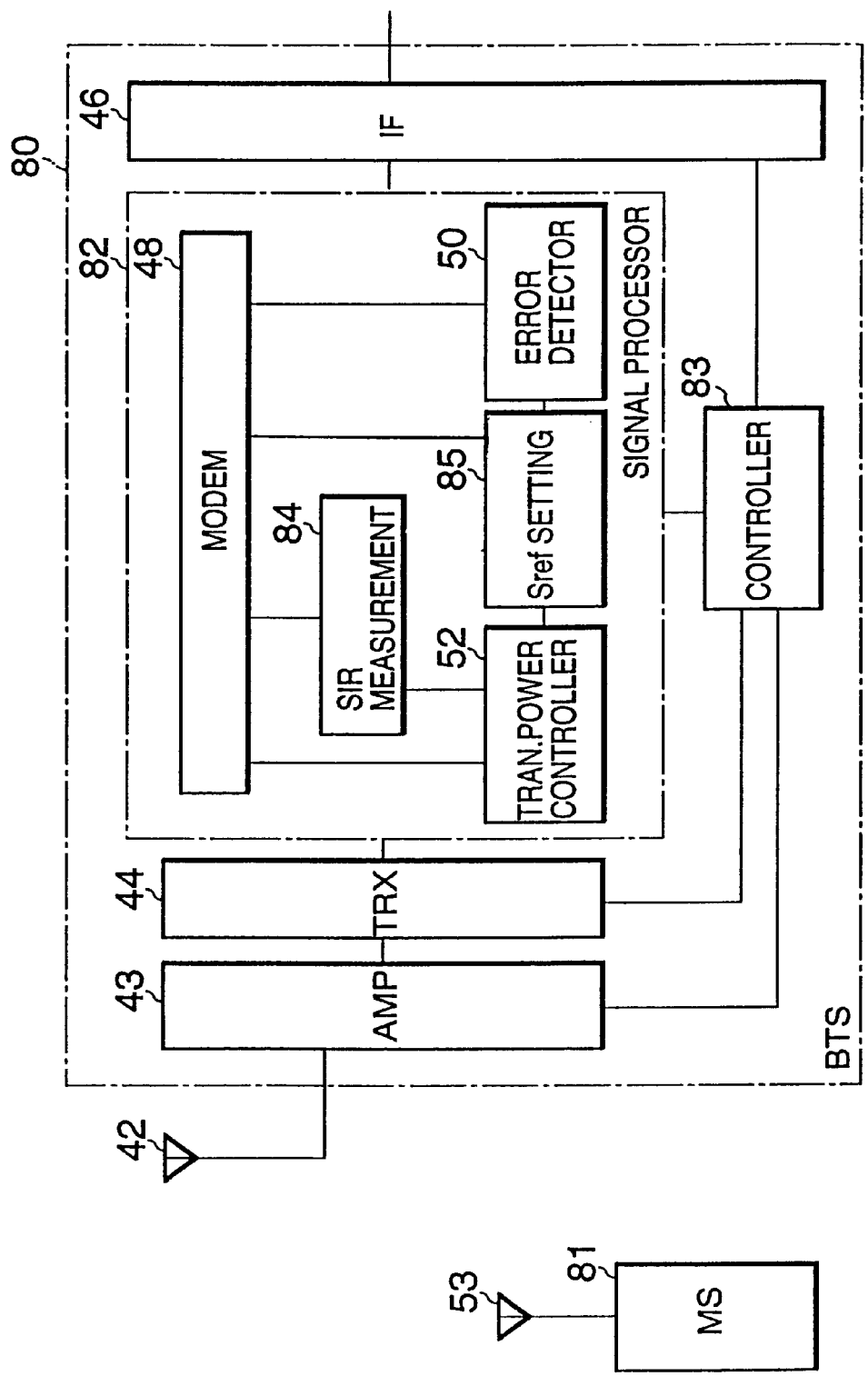
FIG. 10 is a block diagram showing the configuration of a CDMA mobile communications system according to a second embodiment of the present invention.

In FIG. 10, to the same sections as in the first embodiment of FIG. 4, are denoted the same reference numerals and therefore the descriptions thereof are appropriately omitted.

Referring to FIG. 10, a service area in a CDMA communications system is composed of a plurality of areas, which are formed by base transceiver stations BTSs, respectively. In this case, attention is paid to one BTS 80 of the BTSs and a mobile station(MS) 81 located in the area of this BTS 80. Two-way radio communication by CDMA transmission is performed between the BTS 80 and the MS 81. The respective BTSs are connected to a host station RNC (not shown) through network channels.

The BTS 80 has an antenna 42, an AMP 43, a TRX 44, signal processor 81 and an IF 46. The signal processor 82 performs transmission and reception signal processing and, in the second embodiment, further performs demodulation of a received signal inputted from the TRX 44, the high-speed closed loop control for controlling the transmission power of the MS 81 base on the measured receiving SIR, and the outer loop control for updating its reference SIR Sref using Sref information contained in a signal received from the MS 81. Further, the BTS 80 has a controller 47 which controls AMP 43, TRX 44, signal processor 82 and IF 46 so that the BTS 80 can provide call processing function and state control function thereof.

The signal processor 82 includes a modem 48, a SIR measuring section 84 that measures the SIR of a received signal demodulated by the modem 48, an error detecting section 50 that detects errors of the demodulated signal, a reference value setting section 85 that sets the reference SIR Sref of the BTS 80 based on the Sref information contained in the received signal, and a transmission power controller 52 that generates TPC bits for performing the transmission power control for the MS 81 based on the measured receiving SIR and the reference SIR Sref set by the reference value setting section 85.

The MS 81 has an antenna 53 and transmits and receives uplink and downlink radio frame signals to and from the BTS 80 through the antenna 53. The MS 81 is designed to control the transmission power of a frame signal to be transmitted on the uplink channel by referring to the TPC bits contained in the frame signal on the downlink channel received from the BTS 80.

Now in the CDMA mobile communications system of the second embodiment, attention is paid to the outer loop control in the downlink channel. That is, the reference SIR Sref, which is held in the MS, is also updated based on CRC result of a frame signal received from the BTS 80 on the downlink channel. For example, when the CRC result of the frame signal in the downlink channel is "OK", subtraction by the SIRdec is made to update. On the other had, the CRC result is "NG", addition by the SIRinc is made to update. Further, the fact that the Sref has been increased can be notified to the BTS 80 by means of the outer loop control in the downlink channel.

Figure 11:
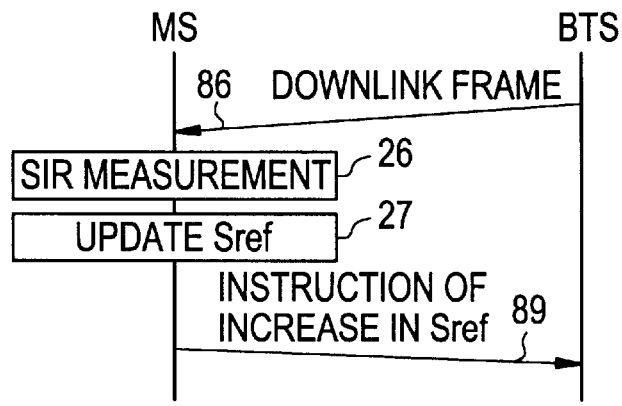
FIG. 11 is a diagram showing a sequence between an MS and a BTS in which the high-speed closed loop control and outer loop control of the CDMA mobile communications system according to the second embodiment are carried out.

FIG. 11 shows a sequence between the MS and the BTS where the high-speed closed loop control and the outer loop control are carried out. First, the MS receives a frame signal 86 on a downlink channel from the BTS and then measures a SIR of the downlink frame signal 86 (step 87). Thereafter, the MS checks the CRC result of the received downlink frame signal and autonomously updates the reference SIR Sref thereof depending on the CRC result (step 88). For example, when the CRC result is "NG" that exhibits the occurrence of bit error, the receiving level is often insufficient. Accordingly, the Sref for the high-speed closed loop control of the downlink channel is increased for the purpose of allowing the BTS to instruct the MS to increase the transmission power by the high-speed closed loop control.

On the other hand, when the CRC result is "OK" that exhibits no occurrence of bit error, the receiving level is often sufficient. Accordingly, the Sref for the high-speed closed loop control of the downlink channel is decreased for the purpose of allowing the BTS to instruct the MS to decrease the transmission power by the high-speed closed loop control so that interference to other channels is kept at a minimum. By comparing the Sref updated by the outer loop control with the receiving SIR measured at the step 87, TPC bits are generated, and the TPC bits are transmitted to the BTS as a uplink frame signal. In that case, the MS according to the second embodiment generates Sref information for notifying the BTS of an increase in the Sref and adds the Sref information to the frame signal of the uplink channel to transmit it to the BTS as notification of the increase in Sref. Incidentally, the BTS refers to the TPC bits contained in the received frame signal on the uplink channel to perform the transmission power increasing or decreasing control. The details will be described hereafter.

Figure 12:
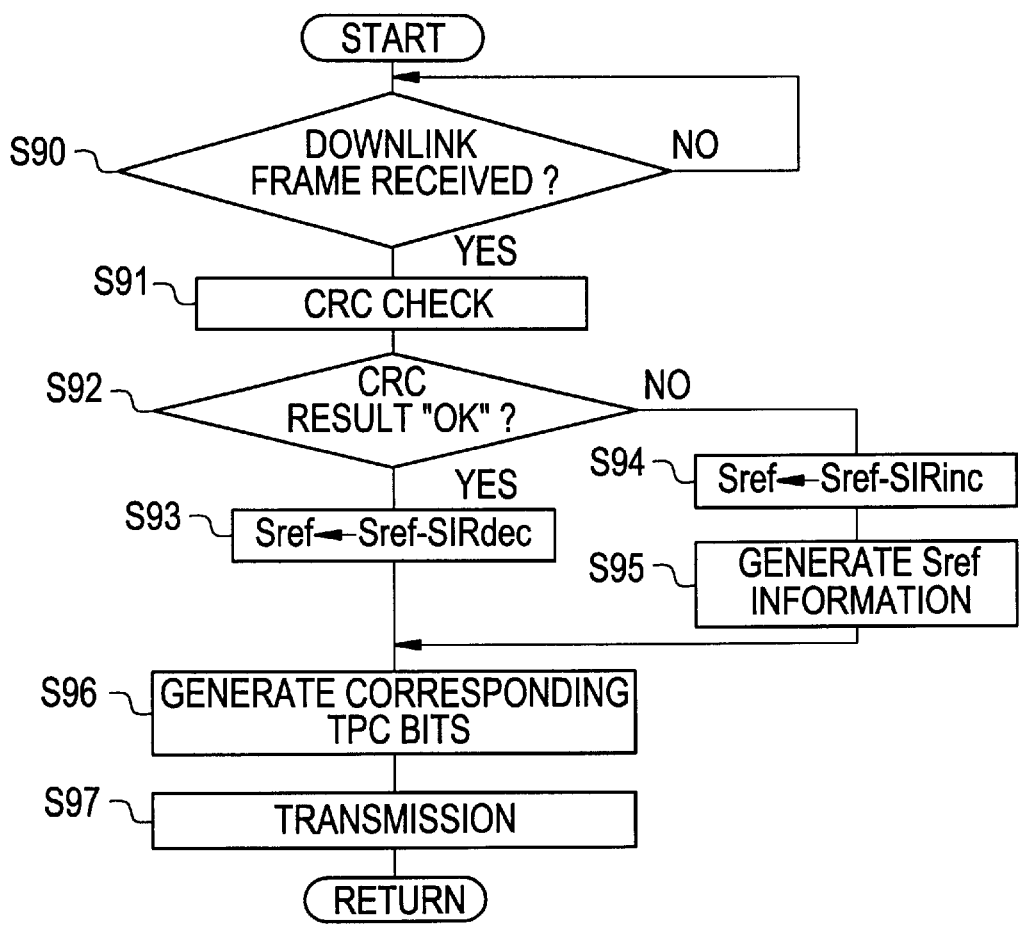
FIG. 12 is a flow chart showing the outline of MS processing according to the second embodiment.

Referring to FIG. 12, the MS monitors a frame signal on the downlink channel from the BTS (Step S90). When receiving a downlink frame signal (YES at Step S90), the MS performs a CRC check with reference to the CRC bits contained in the received frame signal (Step S91). And if the CRC result is "OK" (YES at Step S92), the Sref is updated by subtracting SIRdec from the Sref as shown in the equation (4) so as to decrease in the transmission power to reduce the interference due to an excess transmission power (Step S93).

On the other hand, if the CRC result is "NG" at step S92 (NO at Step S92), the receiving level is often insufficient and therefore the MS updates the Sref by adding the SIRinc to the Sref for the high-speed closed loop control in the downlink channel as shown in the equation (2) for the purpose of allowing the high-speed closed loop control in the uplink channel to instruct the MS to increase in the transmission power (Step S94). After the MS has updated the Sref by increasing the Sref, it generates Sref information showing the fact that the Sref has been updated (Step S95).

The MS is also provided with a receiving SIR measuring section (not shown). Therefore, the MS compares the Sref updated at step S93 or step S94 with the receiving SIR measured by the receiving SIR measuring section and generates TPC bits for instructing the BTS to increase or decrease in the transmission power of the MS (Step S96). The TPC bits and the Sref information generated at step S95 are added to the frame signal on the uplink channel and the uplink frame signal is transmitted to the BTS (Step S97).

Further, the BTS 80 measures a receiving SIR of a frame signal on the uplink channel received from the MS 81 at the SIR measuring section 49. And the error detecting section 50 performs the CRC check of the baseband-processed signal. The result of the CRC check is notified to the reference value setting section 85. The signal processor 82 reads the TPC bits added to the received uplink frame signal and notifies the result to the transmission power controller 52. Thereafter, a transmission power in the downlink channel is determined based on this information. Also, the added Sref information is notified to the reference value setting section 85. The reference value setting section 85 observes the Sref information of the downlink channel and, at the same time, counts an increment count Nms of Sref in the downlink channel within the past predetermined time period Tm [sec]. And a Sref which is used in the high-speed closed loop control in the uplink channel is determined based on the Sref information in the downlink channel notified from the modem 48 and the CRC result notified from the error detecting section 50, and the Sref is notified to the transmission power controller 52.

The controller 83 of the BTS 80, which enables such controls, has a CPU (not shown) and can implement various controls base on programs stored in an external memory such as a magnetic disc or the like or a predetermined memory such as a ROM provided separately. The processing of the controller 83 of the BTS 80 is substantially the same as that shown in FIGS. 5 and 6 and therefore the descriptions thereof are omitted except for the determination processing of the Sref.

Figure 13:
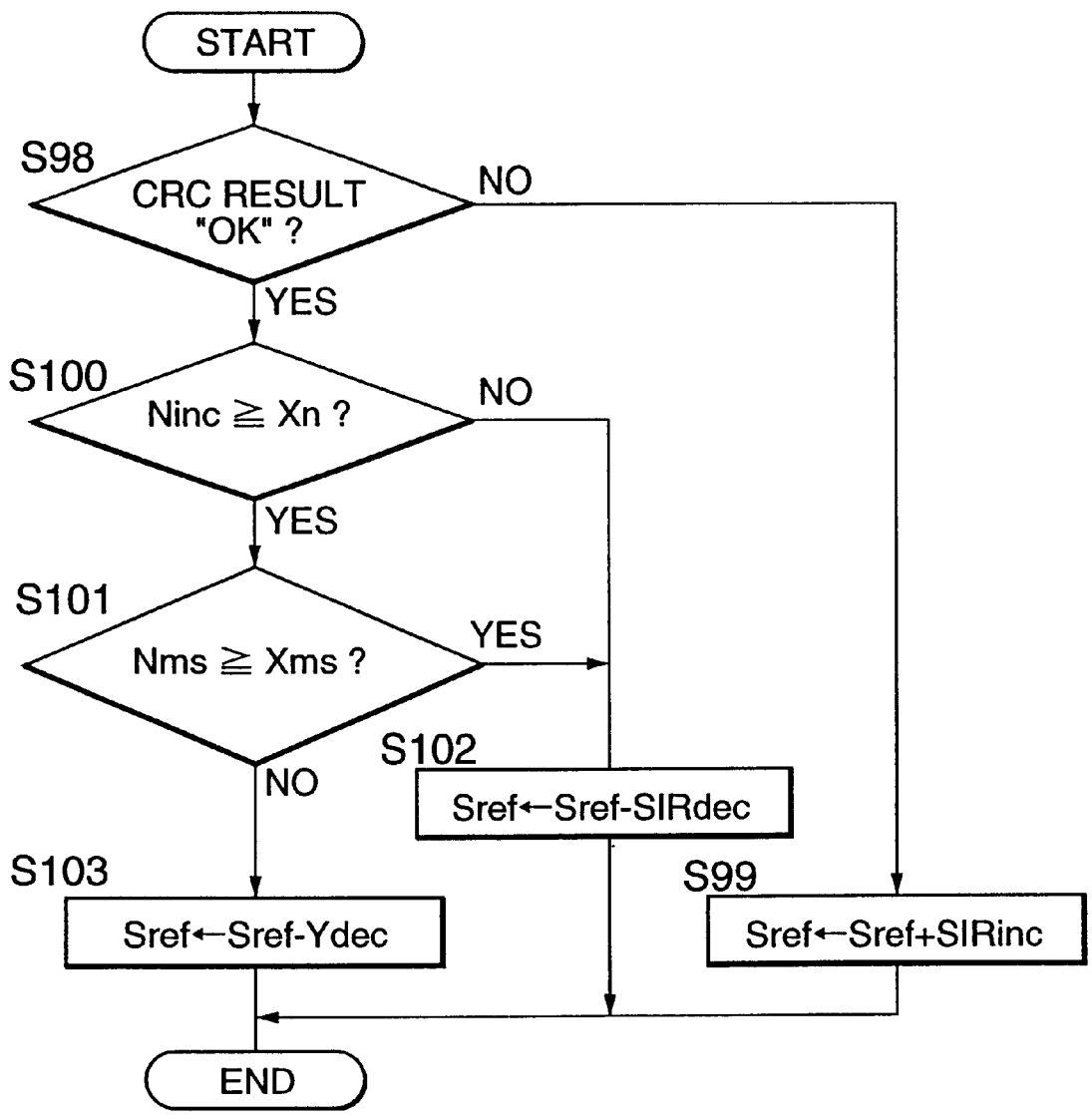
FIG. 13 is a flow chart showing the outline of Sref updating procedure according to the second embodiment.

FIG. 13 shows the Sref update processing of the BTS according to the second embodiment. The reference value setting sections 85 observes the Sref and separately counts the number of times (Ninc) the Sref has been increased for the past predetermined time period Tm [sec] from this point in time and the number of times (Nms) the notification that the Sref in the downlink channel was increased has been received from the MS.

Referring to FIG. 13, if the CRC result notified from the error detecting section 50 is "NG" (NO at Step S98), the reference value setting section 85 increase the Sref so that the transmission power of the MS is increased as in the conventional case and thereby to improve the uplink communication quality. That is, the reference value setting section 85 adds only a predetermined SIRinc [dB] to the Sref as shown in the equation (2) to update the Sref (Step S99), and finishes the update processing of the Sref.

On the other hand, the CRC result is "OK" (YES at Step S98), the Sref is decreased so as to reduce the transmission power of the MS so as to decrease an interference power due to an excess transmission power as in the conventional case. However, in the second embodiment, it can be determined whether the Sref has been rapidly increased to an excess value, from the Ninc counted as the increment count of the Sref within the past specified duration of time Tm [sec] and the increment count Nms of the Sref in the downlink channel received from the MS. And if it is determined that the Sref is rapidly increased, then the BTS 80 subtracts Ydec [dB] which is greater than the conventional SIRdec [dB], and if it is determined that the Sref is not rapidly increased, then the BTS 80 subtracts SIRdec [dB] as in the conventional case. That is, if the CRC result is "OK" at step S98, the increment count Ninc of the Sref within the past predetermined time period Tm [sec] is compared with a predetermined value Xn which is a predetermined increment upper limit as in the first embodiment (Step S100). If the Ninc is equal to or greater than the predetermined value Xn (YES at Step S100), it is determined that the possibility that the Sref is rapidly increased and the BTS does not contribute to the high-speed closed loop control is high, and further it is determined whether the increment count Nms of the Sref in the downlink channel is equal to or greater than the predetermined value Xms (Step S101).

If the increment count Nms of the Sref in the downlink channel is equal to or greater than the predetermined value Xms (YES at Step S101), then it means that the Sref in the downlink channel has been frequently increased. Accordingly, it can be determined that propagation condition in the downlink channel has been deteriorated. In general, there is a correlation to some extent between uplink and downlink channels. Thus, if propagation condition of the downlink channel is deteriorated, then there is a high possibility that propagation condition in the uplink channel is also deteriorated. Accordingly, it is determined that the Sref has been rapidly increased, and as shown in the equation (4) subtraction by the conventional increment SIRdec is performed to update the Sref (Step S102).

On the other hand, if the increment count Nms of the Sref in the downlink channel is smaller than the predetermined value Xms (NO at Step S101), the Sref in the downlink channel is hardly increased. Accordingly, propagation condition in the downlink channel is not so deteriorated, and it can be determined that propagation condition in the uplink channel is not deteriorated, too. Therefore, it can be determined that the rapid increase of the Sref is a phenomenon which is not derived from a change in propagation condition in the uplink channel but derived from a BTS which does not contribute to the high-speed closed loop control in the DHO state. Therefore, the Sref is updated by subtracting the Ydec which is a larger value than the conventional decrement SIRdec as shown by the equation (3) (Step S103).

Further, even if the CRC result is "OK" at step S98, when the Ninc is smaller than the predetermined Xn (NO at Step S100), it is determined that there is no rapid increase in the Sref. After that, an update of the Sref is performed by the subtraction of SIRdec as shown by the equation (4) (Step S102).

As described above, according to the second embodiment, in the outer loop control in the downlink channel where the Sref used for a high-speed closed loop control for controlling the BTS is corrected at the MS, the MS uses a frame signal of the uplink channel to notify the BTS, that the Sref was increased upon the update of the Sref in the downlink channel. This BTS counts the number of times Ninc the Sref has been increased for the past predetermined time period Tm [sec] from this point in time as in the first embodiment, and at the same time counts the number of times Nms the notification that the Sref in the downlink channel was increased has been received from the MS for the past predetermined time period Tm [sec] from this point in time.

When the CRC result is "OK" at the reference value setting section 85, the Sref in the uplink channel is decreased to update. However, if the Ninc is equal to or greater than the predetermined Xn and the Nms is smaller than the predetermined Xms, then it is determined that the Sref in the uplink channel is rapidly increased and does not contribute to the high-speed closed loop control. As the result, the Sref in the uplink channel is updated by subtracting Ydec which is greater than the SIRdec.

Further, if the CRC result is "OK" and the Ninc is equal to or greater than the predetermined Xn, but the Nms is equal to or larger than Xms, the Sref in the downlink channel is frequently increased. Thus, it is determined that propagation condition in the downlink channel has been deteriorated. And since the propagation condition has been also deteriorated in the uplink channel which is associated with the Sref in the downlink channel, it is determined that the Sref in the uplink channel has been rapidly increased. Thereafter, an update of the Sref in the uplink channel is performed by subtraction of SIRdec. Therefore, in the case of variations in SIR occurring from BTS to BTS, when the MS is moved in the vicinity of BTS whose Sref in the uplink channel is rapidly increased and which does not contribute to the high-speed closed loop control, requirement of an excess transmission power for the Ms can be avoided. As the result, an amount of interference in the uplink channel can be decreased.

Third Embodiment

In the CDMA mobile communications system according to the first and second embodiments, the BTSs which do not contribute to the high-speed closed loop control in the DHO state can be determined, and even if there is a wide range of variations in reference SIRs Srefs which are set to the respective BTSs connected to the MS by the outer loop control, a Sref can be decreased to an appropriate Sref for a short time by increasing a decreasing step.

In contrast, in a CDMA mobile communications system according to the third embodiment, the BTSs which do not contribute to the high-speed closed loop control in the DHO state can be determined, and a reduced range of variations in Srefs which are set to the respective BTSs connected to the MS by the outer loop control, can be achieved. As the result, the communication quality of overall service areas is maintained.

The CDMA mobile communications system according to the third embodiment has the same configuration as in the CDMA mobile communications system of the first embodiment shown in FIG. 4. The processing of the third embodiment is substantially the same as shown in FIGS. 5 and 6 except for only the Sref determination processing at the reference value setting section. More specifically, at the reference setting section, the Sref and the receiving SIR notified from the SIR measuring section average for a measurement period Tave [sec] to produce an average receiving SIR (hereinafter referred to as Arcv) and an average reference SIR Sref (hereinafter referred to as Aref), respectively. And a Sref used for the high-speed closed loop control is determined based on a difference between these Arcv and Aref and the CRC result notified from the error detecting section 50 and is output to the transmission power controller 52.

Figure 14:
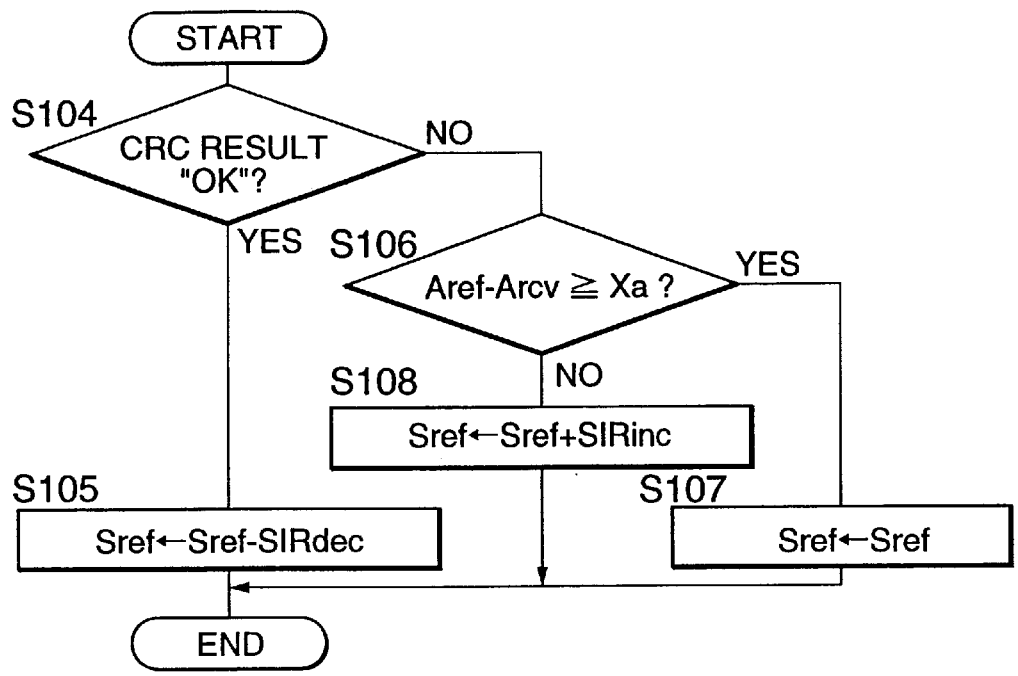
FIG. 14 is a flowchart showing the outline of Sref updating procedure according to a third embodiment of the present invention.

FIG. 14 shows the Sref update processing of the BTS according to the third embodiment. As mentioned above, regarding the receiving SIR and Sref, the average for the measurement period Tave is taken at the reference value setting section. If the CRC result notified from the error detecting section 50 is "OK" (YES at Step S104), the reference value setting section decreases the Sref to suppress the interference by reducing an excess transmission power as in the conventional case. That is, the Sref is updated by the subtraction of only SIRdec [dB] predetermined as shown in the equation (4) (Step S105) and the update processing of the Sref is finished.

On the other hand, the CRC result is "NG" (NO at Step S104), in the first and second embodiments, the Sref is increased to improve the receiving quality at the BTS by increasing the transmission power of the MS as in the conventional case. However, according to the third embodiment, to determine whether the BTS contributes to the high-speed closed loop control, a difference between the Aref and the Arcv is compared with a predetermined value Xa (Step S106). If the Sref is excessively increased and the BTS does not contribute to the high-speed closed loop control, then the value of Sref significantly becomes larger as compared with the receiving SIR. Therefore, if the difference between the Aref and the Acv is equal to or greater than the predetermined value Xa (YES at Step S106), then it is determined that the BTS in which the Sref is excessively increased does not contribute to the high-speed closed loop control, and an update of the Sref is not performed (Step S107). On the other hand, if the difference between the Aref and the Acv is smaller than the predetermined value Xa (NO at Step S106), it is determined that the BTS contributes to the high-speed closed loop control, and the Sref is updated by the addition of SIRinc [dB] predetermined as shown in the equation (4) (Step S108).

As described above, in the CDMA mobile communications system according to the third embodiment, regarding the receiving SIR notified from the SIR measuring section and the Sref, the reference value setting section observes the average as Arcv and Aref for the measurement period Tave [sec]. And if the Sref is excessively increased and the BTS does not contribute to the high-speed closed loop control under a condition that the CRC result is "OK", it is noted that the value of the Sref significantly becomes larger as compared with the receiving SIR. Then, if the difference between the Arcv and the Aref is equal to or greater than the predetermined value Xa, it is determined that the BTS does not contribute to the high-speed closed loop control in the DHO state. Accordingly, the update of the Sref was not performed. Thus, in the outer loop control for correcting the Sref which is used in the high-speed closed loop control for controlling the transmission power between the BTS and the MS, such a state that a wide range of variations in Srefs of BTSs is generated can be avoided. As a result, an amount of interference in the uplink channel can be decreased.

Fourth Embodiment

In the CDMA mobile communications system according to the second embodiment, the MS notifies the BTS by using a frame signal of the uplink channel, that the Sref has been increased by the outer loop control in the downlink channel at the MS. And it is determined whether the Sref is excessively increased and the BTS does not contribute to the high-speed closed loop control or not.

In contrast, according to the fourth embodiment, it is determined based on the receiving SIR information of a pilot signal of a downlink channel notified from the MS, whether the BTS does not contribute to the high-speed closed loop control or not. Thus, a phenomenon that the Sref is excessively increased can be avoided for the BTS which does not contribute to the high-speed closed loop control as in the third embodiment.

A CDMA communication mobile communications system of the fourth embodiment has the same configuration as the CDMA communication mobile communications system of the second embodiment as shown in FIG. 10, and has substantially the same processing as shown in FIGS. 5 and 6, except for the processing of determining the Sref at the reference value setting section. Further, the MS according to the fourth embodiment is configured such that it can measure a receiving SIR of the pilot signal which is always being transmitted from a periodically connected BTS, then can generate receiving SIR information to transmit it to the BTS using the uplink channel by adding the receiving SIR information to a frame signal of the uplink channel. The pilot signal is a broadcasting signal which is always being transmitted from each BTS and is used for the outer loop control other than a conventional case where the pilot signal is used when the MS identifies a connected BTS.

Figure 15A:
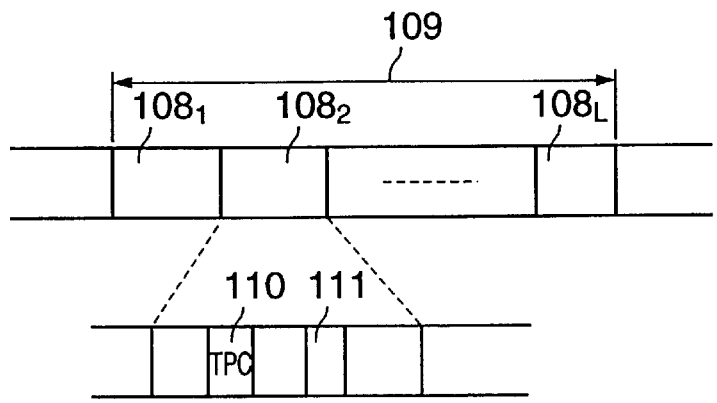
FIG. 15A is an explanatory view showing one example of configurations of the uplink channel frame formats transmitted by the MS according to a fourth embodiment of the present invention.
Figure 15B:
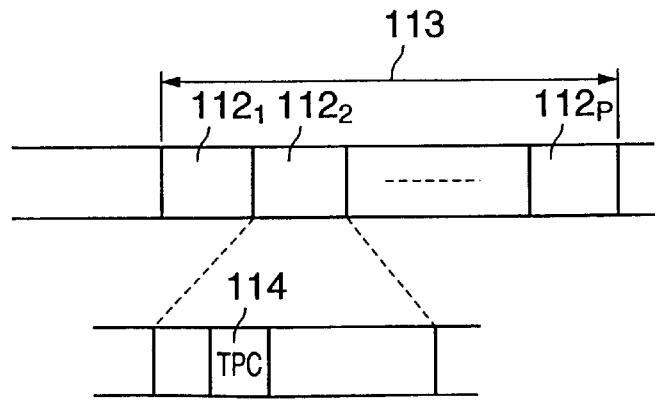
FIG. 15B is an explanatory view showing one example of configurations of the downlink channel frame formats received by the MS according to the fourth embodiment.

FIG. 15A shows one example of a frame format configuration in the uplink channel. FIG. 15B shows one example of a frame format configuration in the downlink channel. The uplink channel is used to transmit a frame signal 109 composed of a plurality of slots $108_1$ to $108_L$ as shown in FIG. 15A from the MS to the BTS. A TPC signal 110 for controlling a transmission power from the MS to the BTS and receiving SIR information 111 are added to, for example, a desired position of a slot $108_1$ among the slots.

On the other hand, the downlink channel is used to transmit a frame signal 113 composed of a plurality of slots $12_1$ to $112_P$ as shown in FIG. 15B from the MS to the BTS. A TPC signal 114 for controlling a transmission power from the MS to the BTS is added to, for example, a desired position of a slot $112_2$ among the slots.

The MS which transmits a frame signal in the uplink channel generates received SIR information by the following processing.

Figure 16:
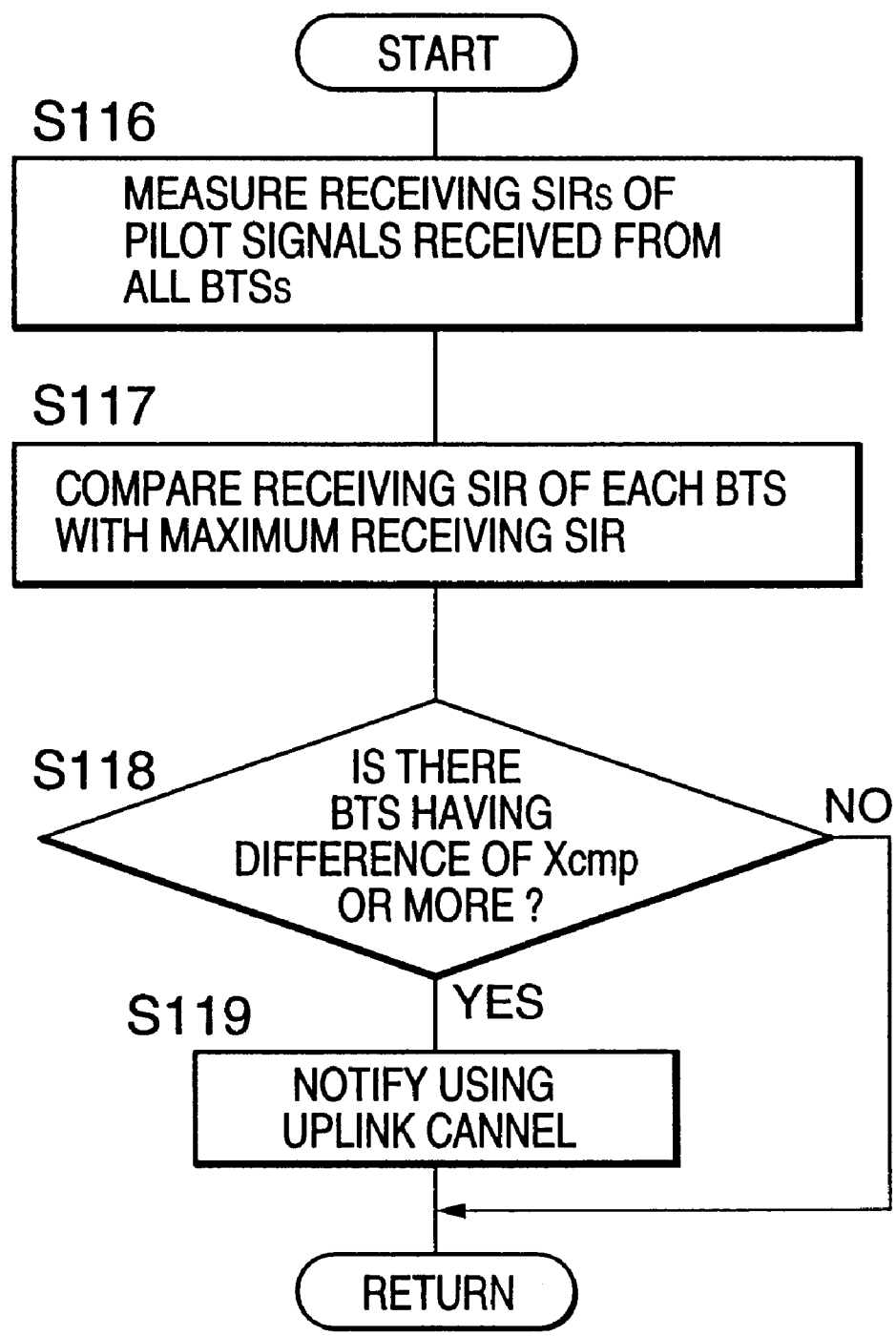
FIG. 16 is a flow chart showing a procedure of generating SIR information according to the fourth embodiment.
Figure 17:
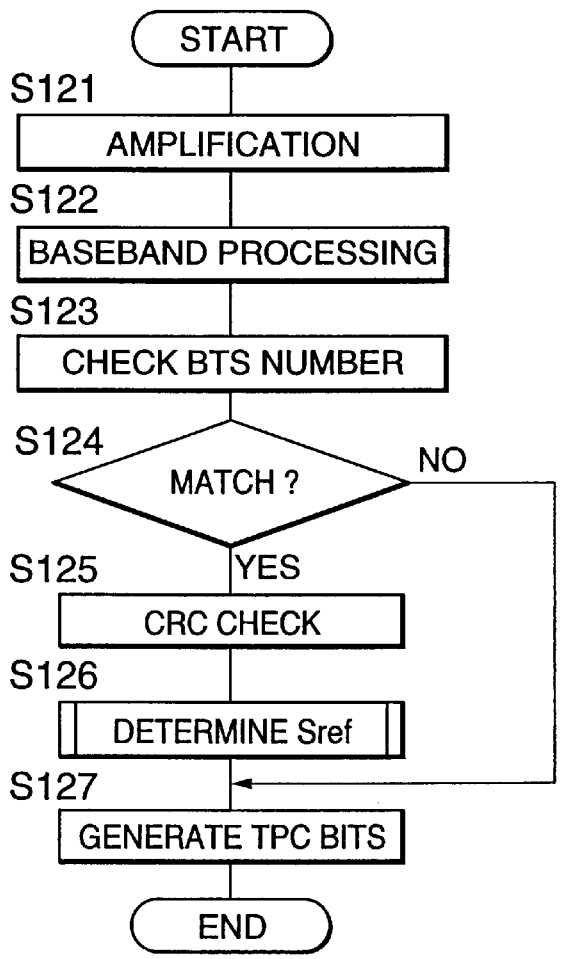
FIG. 17 is a flow chart showing an uplink channel frame reception procedure performed by the controller of a BTS according to the fourth embodiment.

Referring to FIG. 16, the MS measures a receiving SIR of a pilot signal, which is received from each BTS connected as mentioned above (Step S116). Then, the MS detects the maximum receiving SIR value from all receiving SIRs of the pilot signals and determines the presence or absence of a BTS providing a difference between the maximum receiving SIR value and the pilot receiving SIR of each BTS, which is equal to or greater than a predetermined value Xcmp (Step S117). If such a BTS exists (YES at Step S118), the BTS number used as an identification number, which is assigned to every BTS, is added to a frame signal of the uplink channel as pilot receiving SIR information 111 (Step S119). If the above BTS is not found (NO at Step S118), predetermined NULL data, which shows that there is no BTS to which the pilot receiving SIR information is to be transmitted, is added to the uplink frame signal.

Further, a controller of the BTS according to the fourth embodiment has a CPU (not shown), and is configured so that it can implement various controls based on programs stored in an external memory such as a magnetic disc or the like or a desired memory such as a ROM separately provided.

FIG. 14 shows the uplink frame transmission processing executed by the controller of a BTS according to the fourth embodiment. The controller controls the AMP 43 to power-amplify a received frame signal on the uplink channel received through the antenna 42 (Step S121) and frequency-converts the amplified frame signal at the TRX 44. After that, the controller controls the signal processor 45 to perform the baseband processing of the frame signal at the modem 48 (Step S122). At the modem 48, the above-described pilot receiving SIR information is extracted from the baseband-processed received signal, and then a source BTS number included in the pilot receiving SIR information is compared with the BTS number previously assigned to its own station (Step S123). When they match (YES at Step S124), the modem 48 notifies the reference value setting section that the BTS number notification has been received from the MS, and causes the error detecting section to perform the CRC check (Step S125). If the BTS number does not match the source BTS number (NO at Step S124), the generation of TPC bits is directly carried out without the update of the Sref (Step S127).

The reference value setting section according to the fourth embodiment separately counts the number of times Np the notification of the BTS number has been received from the MS for the past predetermined time period Tm [sec]. And the reference value setting section determines the Sref based on the notification count Np and the CRC result notified from the error detecting section (Step S126). The thus-determined Sref is output to the transmission power controller. The transmission power controller generates TPC bits from the Sref notified from the reference value setting section and the receiving SIR measured at the SIR measuring section (Step S127). After that, the control goes back to the monitoring step of a received frame on the uplink channel.

Figure 18:
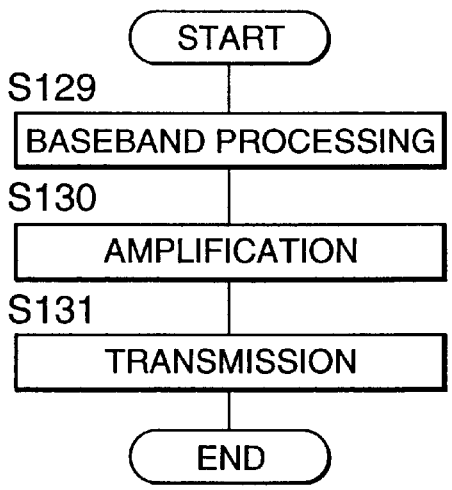
FIG. 18 is a flow chart showing a downlink channel frame transmission procedure performed by the controller of the BTS according to the fourth embodiment.

FIG. 18 shows the downlink frame receiving processing of the BTS according to the fourth embodiment. For example, when the controller receives a request to transmit a TPC signal generated at the step S127 as a frame signal in the downlink channel from the transmission power controller, the controller adds the generated TPC bits to the frame signal of the downlink channel and instructs the modem 48 to perform transmission baseband processing (Step S129). After the frequency conversion at TRX 44, the controller causes the AMR 43 to power-amplify the signal (Step S130) and transmit the amplified signal from the antenna 42 (Step S131). Thus a series of transmission processing is finished.

Figure 19:
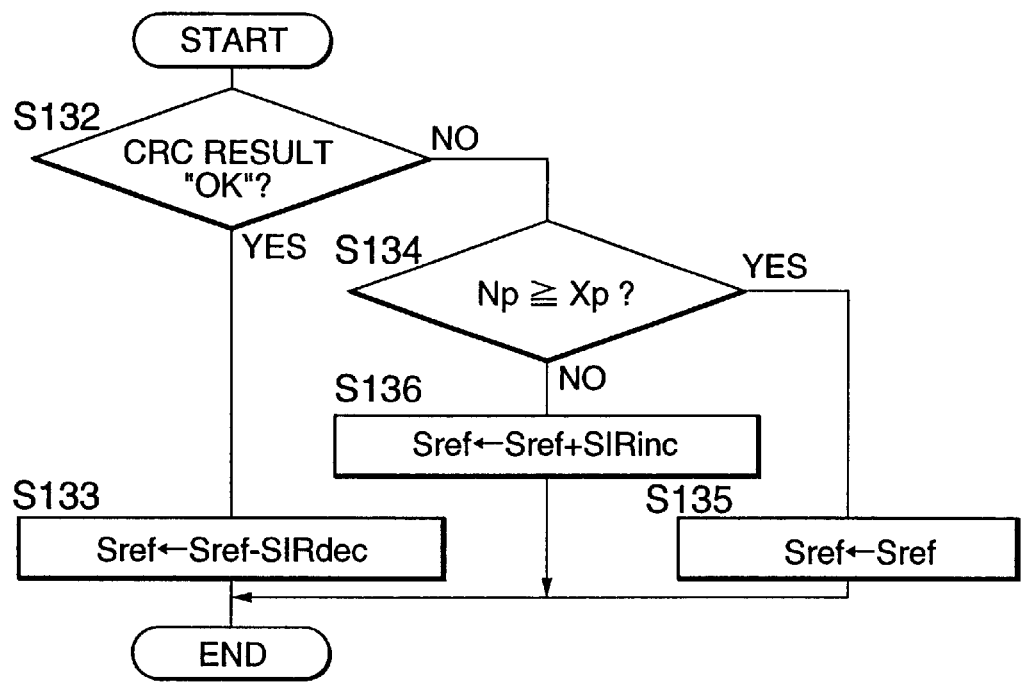
FIG. 19 is a flow chart showing a Sref updating procedure according to the fourth embodiment.

FIG. 19 shows the Sref update processing according to the fourth embodiment. The reference value setting section observes the Sref and separately counts the number of times Np the notification of the BTS number has been received from the MS for the past predetermined time period Tm [sec] from the present time. If the CRC result notified from the error detecting section is "OK" (YES at Step S132), the reference value setting section decreases the Sref to reduce an interference power by decreasing an excess transmission power as in the conventional case. That is, the Sref is updated by subtracting a predetermined SIRdec [dB] from the Sref as shown by the equation (4) (Step S133). As a result, the update processing of Sref is finished.

On the other hand, if the CRC result is "NG" (NO at Step S132), in the first and second embodiments, the Sref is increased to improve the transmission quality at the BTS by increasing the transmission power of the MS to increase the receiving level as in the conventional case.

In contrast, according to the fourth embodiment, the notification count Np is compared with a desired value Xp to determine whether the BTS contributes to the high-speed closed loop control (step S134). This method is also different from the method according to the third embodiment. In the fourth embodiment, the BTS number notified as pilot receiving SIR information from the MS shows a BTS having a large difference from the maximum receiving SIR among the pilot receiving SIRs of the BTSs. Thus it is noted that the BTS having the larger difference has a possibility that it does not contribute to the high-speed closed loop control. Therefore, if the CRC result is "NG" at step 132, then it is first checked whether Np is equal to or greater than Xp (Step S134). If Np is equal to or greater than Xp (YES at Step S134), then it means that a notification indicating that the difference from the maximum receiving SIR at the MS is large has been received a predetermined times or more. Then, it is determined that the BTS does not contribute to the high-speed closed loop control, and no update of the Sref value is performed (Step S135).

On the other hand, if Np is smaller than the desired value Xp (NO at Step S134), it is determined that the BTS contribute to the high-speed closed loop control. As a result, addition of the predetermined SIRinc [dB] is made as shown by the equation (2) as in the conventional case to update the Sref (Step S136).

Thus, in the CDMA mobile communications system according to the fourth embodiment, the MS measures a receiving SIR of a pilot signal, which is always being transmitted by every BTS. Then, if there is a BTS providing a difference of a desired Xcmp or more between the maximum one among the receiving SIRs and the receiving SIR associated with the BTS, then the BTS is notified using its BTS number through the uplink channel. The reference value setting section of the BTS counts the number of times Np the notification of the BTS number has been received from the MS for a predetermined time period Tm [sec]. And if the CRC result is "NG", then the BTS number which is notified as the pilot receiving SIR information received from the MS shows a BTS having a large difference between the maximum receiving SIR among the BTS pilot receiving SIRs connected and the associated receiving SIR. Thus, it is determined that a possibility that the BTS does not contribute to the high-speed closed loop control is high. If Np is equal to or greater than the predetermined value Xp, the reference value setting section determines that the BTS does not contribute to the high-speed closed loop control in the DHO state, and does not update of the Sref. Thus, in the outer loop control for correcting the Sref which is used in the high-speed closed loop control for controlling the transmission power between the BTS and the MS, such a state where a large difference is generated between the Srefs in the BTSs can be avoided. As a result, an amount of the interference in the uplink channel can be decreased.

Fifth Embodiment

The CDMA mobile communications system according to the third or fourth embodiment determines BTSs that do not contribute to the high-speed closed loop control in the DHO state using a frame signal on the uplink channel or receiving SIR information from the MS. However, a CDMA mobile communications system according to the fifth embodiment determines BTSs that do not contribute to the high-speed closed loop control in the DHO state while referring to selective combination information which is notified from an RNC which is the host station of the BTSs.

Figure 20:
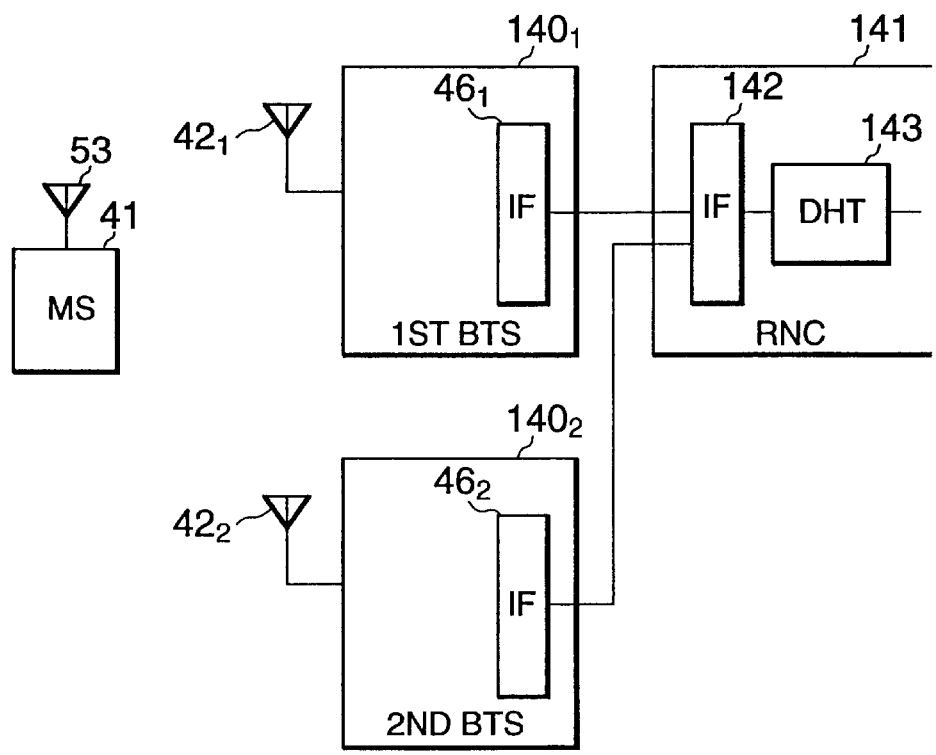
FIG. 20 is a schematic view showing the configuration of a CDNA mobile communications system according to a fifth embodiment of the present invention.

FIG. 20 shows a configuration of a CDMA mobile communications system according to the fifth embodiment. In FIG. 20, the same reference numerals are denoted to the same sections as in the CDMA mobile communications system according to the first and second embodiments shown in FIGS. 4 and 10, and the descriptions thereof are omitted. That is, the CDMA mobile communications system according to the fifth embodiment includes a first BTS $140_1$ and a second BTS $140_2$. Since an MS 41 is the same as the MS according to the first embodiment as shown in FIGS. 4 and 5, the explanation thereof is omitted. Since each of the first BTS$140_1$ and the second BTS$140_2$ has the same configuration as the BTS according to the second embodiment has, the description thereof is omitted.

The RNC 141 is connected to the first BTS$140_1$ and the second BTS$140_2$ through network channels. The RNC 141 includes an interface (IF) section 142 having the transmission and reception interface functions for desired network data transmitted between the BTSs through the respective network channels, and a diversity handover track 143 (hereinafter referred to as DHT), which performs selective combination processing of frame signals received from a plurality of BTSs via the IF section 142. Thus, the plurality of BTSs are connected to the RNC 141 through the network lines, respectively. And the data received from the MS 41 in the DHO state can be received as network data from the BTSs.

Figure 21:
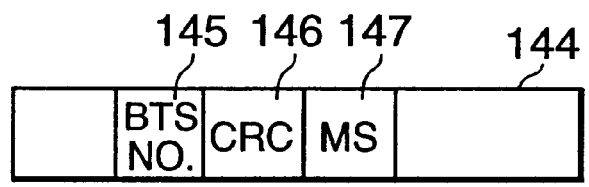
FIG. 21 is an explanatory view showing the outline of a format configuration of network data transmitted and received in a network channel according to the fifth embodiment.

As shown in FIG. 21, network data 144 is generated as a frame data transfer unit, and a BTS number 145, a CRC result 146, and an MS number 147 are added to the network data 144. The network data 144 like this may be an asynchronous transfer mode (ATM) cell or other packet and is generated at each BTS. Each BTS checks the CRC result of a received frame from the connected MS, and sends the CRC result, the BTS number of its own station, and the MS number for the identification number of the connected MS to the RNC 141.

The RNC 141 receives a plurality of network data 144 through the IF section 142 and performs the selective combination processing at the DHT 143.

Figure 22:
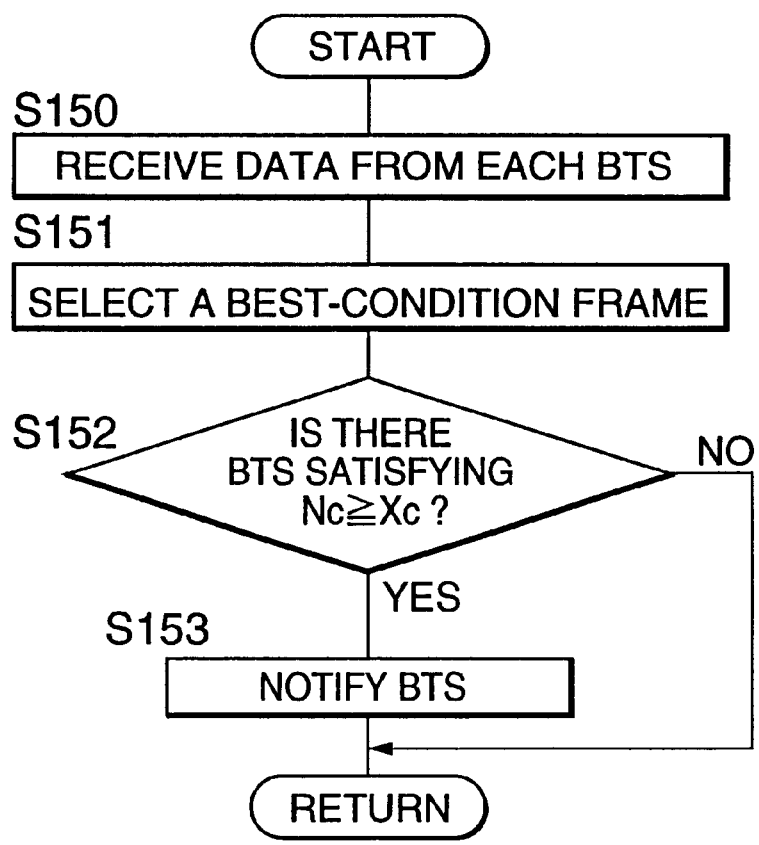
FIG. 22 is a flow chart showing the outline of selective combination processing of RNC according to the fifth embodiment.

Referring to FIG. 22, the RNC 141 receives data having the format as shown in FIG. 21 through the IF section 142 from each BTS (Step S150). Then, the DHT 143 selects a frame having the most excellent receiving sensitivity from received frames based on the CRC result contained in the network data as quality information (Step S151). Also the DHT 143 observes the number of non-selection times Nc in the selective combination processing for each connected BTS. More specifically, independently of the selective combination processing, the DHT 143 counts the number of non-selection times Nc for the past predetermined time period Tm [sec] from the present time for each connected BTS. When there is a BTS having the Nc equal to or greater than a desired value Xc (YES at Step S152). the RNC notifies the relevant BTS that the Nc equal to or greater than a desired value Xc (Step S153). It is determined that since the BTS having the Nc which is equal to or greater than the desired value Xc has the deteriorated communication quality, it has a high possibility of no contribution to the high-speed closed loop control. On the other hand, when there is no BTS having the Nc which is equal to or greater than the desired value Xc (NO at Step S152), the data is received from the next BTS without notification.

A BTS which has received such a notification performs the following Sref flag control independently of the Sref update processing.

Figure 23:
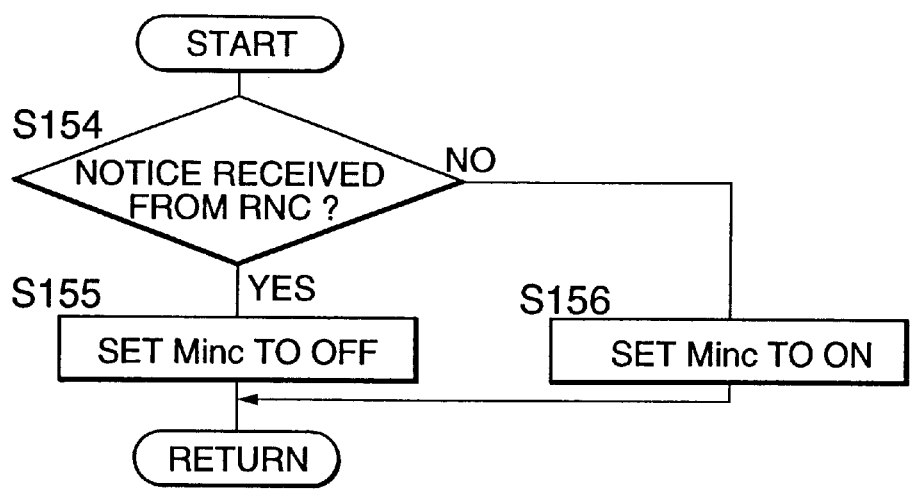
FIG. 23 is a flow chart showing the outline of a Sref flag control according to the fifth embodiment.

Referring to FIG. 23, when receiving from the RNC 143 the notification such that Nc has become Xc or more (YES at Step S154), the BTS sets the Sref increase flag (hereinafter referred to as Minc) to "OFF" state (Step S155). When the BTS did not receive the notification of that Nc has become Xc or more from the RNC 143 (NO at Step S154), it sets Minc to "ON" state (Step S156).

The operation of each BTS in which such a Minc control is carried out is the same as in the first embodiment shown in FIGS. 5 and 6. However, the Sref update processing is different.

Figure 24:
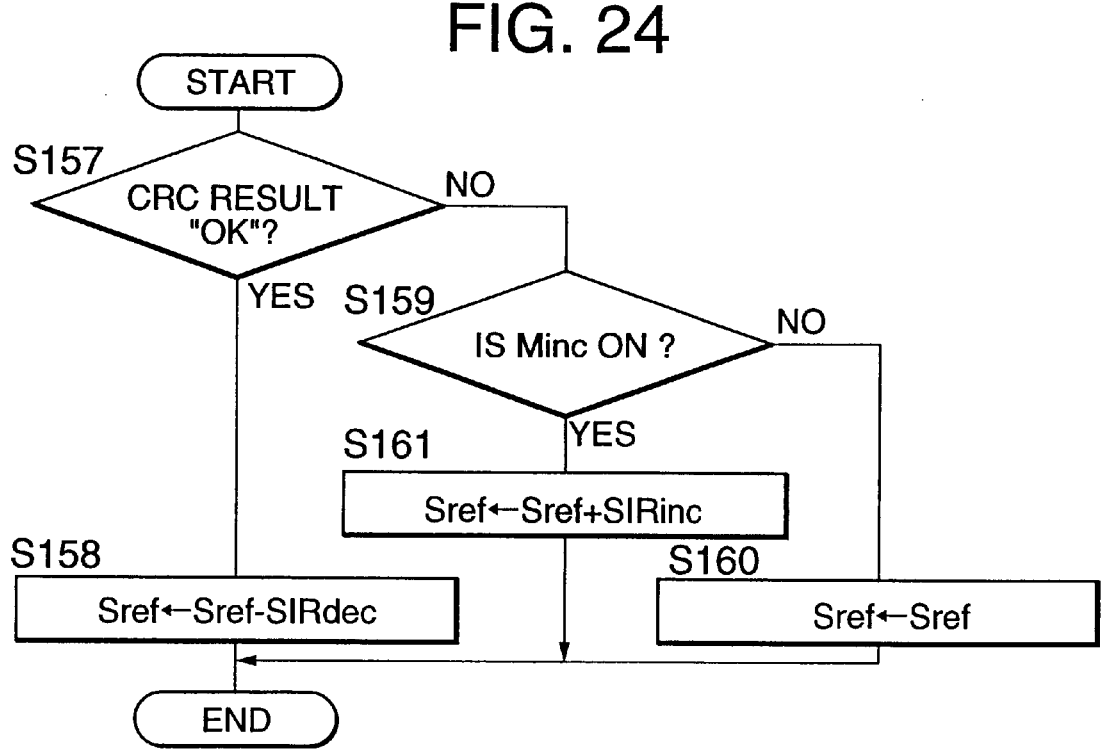
FIG. 24 is a flow chart showing the outline of a Sref updating procedure according to the fifth embodiment.

FIG. 24 shows the Sref update processing according to the fifth embodiment. If the CRC result notified from the error detecting section is "OK" (YES at Step S157), the reference value setting section decreases the Sref to decrease the interference power by reducing an excess transmission power as in the conventional case. That is, subtraction is performed by only a predetermined SIRdec [dB] as shown by the equation (4) to update the Sref (Step S156). Thus, the Sref update processing is finished.

On the other hand, if the CRC result is "NG" (NO at Step S157), it is determined whether the Minc is in the "ON" state or "OFF" state, so as to determine whether the BTS contributes to the high-speed closed loop control (Step S159). If the non-selection count Nc for the past predetermined time period Tm [sec] from this point in time for every connected BTS is equal to or greater than a desired value Xc, the Minc is a flag to determine that a possibility of non-contribution to the high-speed closed loop control is high because of deteriorated communication quality as shown in FIG. 23. Therefore, if the Minc is in the "OFF" state (NO at Step S159), the updating of the Sref value is not performed (Step S160) because it is determined that the BTS does not contribute to the high-speed closed loop control due to the deteriorated communication quality and therefore the Minc is set as shown in FIG. 23.

On the other hand, the Minc is in the "ON" state (YES at Step S159), it is determined that the BTS contributes to the high-speed closed loop control. As a result, addition of a predetermined SIRinc [dB] is made as shown by the equation (2) and the Sref is updated (Step S161).

As described above, in the CDMA mobile communications system according to the fifth embodiment, a frame having the most excellent receiving sensitivity is selected by selective combination processing based on quality information such as CRC and the like contained in a frame signal received from each BTS at the RNC which is a host station of the BTSs. And the RNC counts the number of times Nc no selection has been made for the past predetermined time period Tm [sec] from this point in time for every connected BTS. Then, if there is found a BTS having the Nc, which is equal to or greater than the desired value Xc, the BTS is notified that the Nc is equal to or greater than the desired value Xc. The BTS sets the Minc to "OFF" state only when it received this notification. And if the CRC result is "NG", then the reference value setting section determines that a possibility of no contribution to the high-speed closed loop control is high because of the deteriorated communication quality when the Minc is in the "OFF" mode, and an update of the Sref is not performed. Accordingly, by the outer loop control for correcting the Sref using the high-speed closed loop control which controls a transmission power between the BTS and the MS, such a state where a large difference is generated between Srefs by the BTSs can be avoided, and as a result an amount of interference in the uplink channel can be decreased.

Sixth Embodiment

In the CDMA mobile communication system according to the fifth embodiment, the RNC counts the number of times no selection has been made for the past specified duration of time Tm [sec] by the selective combination information based on quality information notified from each BTS. And based on the non-selection count, it is determined that the BTS does not contribute to the high-speed closed loop control in the DHO state.

In contrast, in a CDMA mobile communications system according to the sixth embodiment, the RNC inquires about the Sref for every BTS connected to the same MS, and selects the minimum Sref from collected Srefs, and then notifies these BTSs of the minimum Sref.

In the CDMA mobile communications system according to the sixth embodiment, a plurality of BTSs connected to the MS in the DHO state are connected to an RNC which is the host station through network lines, as shown in FIG. 20. And the RNC periodically inquires about the Sref to these BTSs based on the network data having the format as shown in FIG. 21. The RNC selects the minimum Sref from all Srefs of BTSs connected to the MS in the DHO state and notifies the BTSs of this minimum value. Each BTS directly changes the Sref to the minimum Sref value at the reference value setting section. The update processing of the Sref is periodically performed and the Srefs of all BTSs connected to the MS in the DHO state are allowed to match. As a result, a phenomenon that the Sref is excessively increased at the BTS which does not contribute to the high-speed closed loop control in the DHO state can be avoided.

Further, processing of inquiring about the Sref to all BTSs connected to the MS in the DHO state from the RNC may be performed at the DHT only when the existence of difference between communication qualities in BTSs is detected. The difference between receiving qualities can be easily detected by monitoring the CRS result contained in network data notified from each BTS or the receiving SIR. Accordingly, an amount of data transmitted between the RNC and the BTS can be decreased.

Thus, in the CDMA mobile communications system according to the sixth embodiment, the Sref is inquired from the RNC to all BTSs connected to the MS in the DHO state. And the RNC selects the minimum Sref from all Srefs notified and sends the minimum Sref as setting data to all BTSs. As a result, a phenomenon that the Sref is excessively increased at the BTS which does not contribute to the high-speed closed loop control in the DHO state can be avoided.

As described above, according to the present invention, when variations in SIRs occur in base transceiver stations connected to a mobile station in the DHO state,Y and the mobile station is moving to the vicinity of the base transceiver station whose Sref is rapidly increased and which does not contribute to the high-speed closed loop control, the transmission of an instruction for requesting an excess transmission power from the mobile station can be avoided. As a result, an amount of interference in the uplink channel can be decreased.

Further, in addition to the above-mentioned advantage, in consideration of the correlation between actual results of propagation condition of the opposite party device, a base transceiver station which does not contribute to the high-speed closed loop control can be found and an outer loop control can be performed with higher precision.

Further, according to the present invention, in the outer loop control for correcting the Sref used in the high-speed closed loop control which controls the transmission power between the base transceiver station and the mobile station, such a state where a wide range of variations in Srefs occurs in the base transceiver stations can be avoided. As a result, an amount of interference in the uplink channel can be decreased. Further, since control can be made only within a base transceiver station, the system can be simplified. Furthermore, since the control can be made depending on information received from the mobile station, a direct and precise outer loop control can be achieved.

Further, by a batch control with a radio network device, the radio communication can be omitted in a control of the reference values for the transmission power control of plurality of base transceiver stations connected to the mobile station in the DHO state. Accordingly, the communication efficiency in the entire system can be enhanced.

Further, by using very simple processing, the reference values for the transmission power in all base transceiver stations in the DHO state can be kept to the same.

What is claimed is:

1. A method for controlling a first reference SIR (Signal-to-Interference power Ratio) which is used as a reference of a closed loop control by a first radio station to control transmission power of a second ratio station connected to the first radio station by radio in a mobile communication system, comprising the steps of:

a) determining whether a first radio channel used to communicate with the second radio station has sufficient communication quality;

b) when the first radio channel has insufficient communication quality, increasing the first reference SIR by a predetermined increase amount;

c) when the first radio channel has sufficient communication quality, determining whether the first radio station is involved in the closed loop control controlling transmission power of the second radio station;

d) when the first radio station is involved in the closed loop control, decreasing the first reference SIR by a predetermined first decrease amount; and e) when the first radio station is not involved in the closed loop control, decreasing the first reference SIR by a predetermined second decrease amount which is greater than the predetermined first decrease amount.

2. The method according to claim 1, wherein the step (c) comprises the steps of:

c.1) detecting an increase amount of the first reference SIR over a past time period from a current time point within a predetermined time period;

c.2) determining whether the increase amount of the first reference SIR is smaller than a predetermined threshold;

c.3) when the increase amount of the first reference SIR is smaller than the predetermined threshold, determining that the first radio station is involved in the closed loop control; and c.4) when the increase amount of the first reference SIR is not smaller than the predetermined threshold, determining that the first radio station is not involved in the closed loop control.

3. The method according to claim 2, wherein the step (c) further comprises the steps of:

counting the number of times the reference SIR is increased at the step (a) to produce an increase count;

when the increase count for the predetermined time period is smaller than a predetermined count threshold, determining that the first radio station is involved in the closed loop control; and when the increase count for the predetermined time period is not smaller than a predetermined count threshold, performing the step (c.1).

4. The method according to claim 1, further comprising the steps of:

at the second ratio station, f) determining whether a second radio channel used to communicate with the first radio station has sufficient communication quality;

g) when the second ratio channel has insufficient communication quality, increasing a second reference SIR by a predetermined increase amount, wherein the second reference SIR is used as a reference of the closed loop control by the second radio station to control transmission power of the first radio station;

h) when the radio channel has sufficient communication quality, decreasing the second reference SIR by a predetermined decrease amount; and i) when the second reference SIR has been increased at the step (g), sending a reference increase notification to the first radio station, wherein the step (c) comprises the steps of:

c.1) counting the number of times the references increase notification has been received from the second ratio station for a predetermined time period, to produce a notification count;

c.2) when the notification count is not smaller than a predetermined count threshold, determining that the first radio station is involved in the closed loop control; and c.3) when the notification count is smaller than the predetermined count threshold, determining that the first radio station is not involved in the closed loop control.

5. A method for controlling a reference SIR (Signal-to-Interference power Ratio) which is used as a reference of a closed loop control by a first radio station to control transmission power of a second ratio station connected to the first radio station by radio in a mobile communications system, comprising the steps of:

a) determining whether a radio channel used to communicate with the second ratio station has sufficient communication quality;

b) when the first radio channel has sufficient communication quality, decreasing the reference SIR by a predetermined decrease amount;

c) when the first radio channel has insufficient communication quality, determining whether the first radio station is involved in the closed loop control controlling transmission power of the second radio station;

d) when the first radio station is involved in the closed loop control, increasing the reference SIR by a predetermined increase amount; and e) when the first radio station is not involved in the closed loop control, causing the reference SIR not to be changed.

6. The method according to claim 5, wherein the step (c) comprises the steps of:
  c.1) calculating an average reference SIR over a predetermined past time period from a current time point;
  c.2) calculating an average receiving SIR over the predetermined past time period by averaging SIRs of signals received for the predetermined past time period;
  c.3) determining whether a SIR difference between the average reference SIR and the average receiving SIR is smaller than a predetermined threshold;
  c.2) when the SIR different is smaller than the predetermined threshold, determining that the first radio station is involved in the closed loop control; and
  c.3) when the SIR difference is not smaller than the predetermined threshold, determining that the first radio station is not involved in the closed loop control.

7. In a mobile communications system composed of a plurality of base transceiver stations and a plurality of mobile stations, a method for controlling a first reference SIR (Signal-to-Interference power Ratio) which is used as a reference of a closed loop control by a base transceiver station to control transmission power of a mobile station connected to a plurality of base transceiver stations, comprising the steps of:
  at the mobile station,
    a) measuring a second receiving SIR by receiving a broadcasting signal from each of the base transceiver stations connected to the mobile station;
    b) finding a first base transceiver station having a maximum second receiving SIR among the base transceiver stations connected to the mobile station;
    c) selecting a second base transceiver station such that a SIR difference between the maximum second receiving SIR and a second receiving SIR of the second base transceiver station is not smaller than a predetermined SIR difference threshold;
    d) sending a notification including an identification of the second base transceiver station to the base transceiver stations connected to the mobile station;
  at each of the base transceiver stations connected to the mobile station,
    e) determining whether the identification included in the notification received from the mobile station is identical to an identification assigned thereto;
    f) when the identification included in the notification is identical to the identification of its own, determining whether a radio channel used to communicate with the mobile station has sufficient communication quality;
    g) when the radio channel has sufficient communication quality, decreasing the first reference SIR by a predetermined decrease amount;
    h) when the ratio channel has insufficient communication quality, determining whether the base transceiver station is involved in the closed loop control controlling transmission power of the mobile station, based on the number of times the notification has been received from the mobile station for a predetermined time period;
    i) when the base transceiver station is involved in the closed loop control, increasing the first reference SIR by a predetermined increase amount; and
    j) when the base transceiver station is not involved in the closed loop control, causing the first reference SIR not to be changed.

8. In a mobile communications system composed of a network controller, a plurality of base transceiver stations connected to the network controller, and a plurality of mobile stations, a method for controlling a reference SIR (Signal-to-Interference power Ratio) which is used as a reference of a closed loop control by a base transceiver station to control transmission power of a mobile station connected to a plurality of base transceiver stations, comprising the steps of:
  at the network controller,
    a) receiving a frame of data received by each of the base transceiver stations from the mobile station;
    b) selecting a frame of data having best condition among a plurality of frames of data received by the base transceiver stations;
    c) counting the number of times a frame of data having best condition has not been selected for a predetermined time period to produce a non-selection count for each of the base transceiver stations;
    d) selecting a first base transceiver station having a non-selection count which is not smaller than a predetermined count threshold;
    e) sending a non-selection notification to the first base transceiver station; at each of the base transceiver stations connected to the mobile station,
    f) determining whether the non-selection notification is received from the network controller;
    g) determining whether a radio channel used to communicate with the mobile station has sufficient communication quality;
    h) when the radio channel has sufficient communication quality, decreasing the reference SIR by a predetermined decrease amount;
    i) when the radio channel has insufficient communication quality, determining whether the base transceiver station is involved in the closed loop control controlling transmission power of the mobile station, depending on whether the non-selection notification has been received from the network controller;
    j) when the base transceiver station is involved in the closed loop control, increasing the reference SIR by a predetermined increase amount; and
    k) when the base transceiver station is not involved in the closed loop control, causing the reference SIR not to be changed.

9. In a mobile communications system composed of a network controller, a plurality of base transceiver stations connected to the network controller, and a plurality of mobile stations, a method for controlling a reference SIR (Signal-to-Interference power Ratio) which is used as a reference of a closed loop control by a base transceiver station to control transmission power of a mobile station, comprising the steps of:
  at the network controller,
    a) inquiring the reference SIR from each of the plurality of base transceiver stations;
    b) selecting a minimum reference SIR among a plurality of reference SIRs received from the base transceiver stations;
    c) sending the minimum reference SIR to the base transceiver stations;
  at each of the base transceiver stations receiving the minimum reference SIR from the network controller,
    d) replacing a current reference SIR with the minimum reference SIR received from the network controller.

10. A CDMA (Code Division Multiple Access) mobile communications system comprising:
   mobile station having a function of changing transmission power depending on a transmission power control signal; and
   a base station comprising:
      a first measuring section for measuring a receiving SIR (Signal-to-Interference power Ratio) from a received signal on an uplink channel from the mobile station;
      a first transmission power controller for performing a closed loop control controlling the transmission power of the mobile station such that a power decrease request is sent as the transmission power control signal to the mobile station when the receiving SIR exceeds a first predetermined value, and a power increase request is sent as the transmission power control signal to the mobile station when the receiving SIR does not exceed the first predetermined value; and
      a first controller for controlling the first predetermined value such that it is determined whether the uplink channel has sufficient communication quality,
      when the uplink channel has insufficient communication quality, the first predetermined value is increased by a predetermined increase amount,
      when the uplink channel has sufficient communication quality, it is determined whether the base station is involved in the closed loop control;
      when the base station is involved in the closed loop control, the first predetermined value is decreased by a predetermined first decrease amount, and
      when the base station is not involved in the closed loop control, the first predetermined value is decreased by a predetermined second decrease amount which is greater than the predetermined first decrease amount.

11. The CDMA mobile communications system according to claim 10, wherein the mobile station comprises:
   a second controller for determining whether a downlink channel used to communicate with the base station has sufficient communication quality and, when the downlink channel has insufficient communication quality, increasing a second predetermined value by a predetermined increase amount, wherein the second predetermined value is used as a reference of the closed loop control by the mobile station to control transmission power of the base station, and, when the downlink channel has sufficient communication quality, decreasing the second predetermined value by a predetermined decrease amount; and
   a communication section for, when the second predetermined value has been increased, sending a reference increase notification to the base station,
   wherein the first controller of the base station counts the number of times the reference increases notification has been received from the second radio station for a predetermined time period, to produce a notification count and, when the notification count is not smaller than a predetermined count threshold, determines that the base station is involved in the closed loop control, and when the notification count is smaller than the predetermined count threshold, determines that the base station is not involved in the closed loop control.

12. A CDMA (Code Division Multiple Access) mobile communication system comprising:
   a mobile station having a function or changing transmission power depending on a transmission power control signal; and
   a base station comprising:
      a first measuring section for measuring a receiving SIR (Signal-to-Interference power Ratio) from a received signal on an uplink channel from the mobile station;
      a first transmission power controller for performing a closed loop control controlling the transmission power of the mobile station such that a power decrease request is sent as the transmission power control signal to the mobile station when the receiving SIR exceeds a first predetermined value, and a power increase request is sent as the transmission power control signal to the mobile station when the receiving SIR does not exceed the first predetermined value;
      a first calculator for calculating an average first predetermined value over a predetermined past time period from a current time point;
      a second calculator for calculating an average receiving SIR over the predetermined past time period by averaging SIRs of signals received for the predetermined past time period.
      a determiner for determining whether a SIR difference between the average first predetermined value and the average receiving SIR is smaller than a predetermined threshold and, when the SIR difference is smaller than the predetermined threshold, determining that the base station is involved in the closed loop control, and when the SIR difference is not smaller than the predetermined threshold, determining that the base station is not involved in the closed loop control; and
      a first controller for controlling the first predetermined value such that
      it is determined whether the uplink channel has sufficient communication quality,
      when the uplink channel has sufficient communication quality, the first predetermined value is decreased by a predetermined decrease amount,
      when the uplink channel has insufficient communication quality and the base station is involved in the closed loop control, the first predetermined value is increased by a predetermined increase amount, and
      when the uplink channel has insufficient communication quality and the base station is not involved in the closed loop control, the first predetermined value is changed.

13. A CDMA (Code Division Multiple Access) mobile communication system comprising:
   a plurality of base transceiver stations; and
   a plurality of mobile stations,
   wherein each of the mobile stations comprises:
      a measuring section for measuring a second receiving SIR by receiving a broadcasting signal from each of the base transceiver stations connected to the mobile station;
      a selector for finding a first base transceiver station having a maximum second receiving SIR among the base transceiver stations connected to the mobile station and selecting a second base transceiver station such that a SIR difference between the maximum second receiving SIR and a second receiving SIR of the second base transceiver station is not smaller than a predetermined SIR difference threshold; and
      a communication section for sending a notification including an identification of the second base transceiver station to the base transceiver stations connected to the mobile station, and each of the base transceiver stations connected to the mobile station comprises:
- a determiner for determining whether the identification included in the notification received from the mobile station is identical to an identification assigned thereto and, when the identification included in the notification is identical to the identification of its own, determining whether a radio channel used to communicate with the mobile station has sufficient communication quality;
- a controller controlling such that, when the radio channel has sufficient communications quality, the first reference SIR is decreased by a predetermined decrease amount; when the radio channel has insufficient communication quality, it is determined whether the base transceiver station is involved in the closed loop control controlling transmission power of the mobile station, based on the number of times the notification has been received from the mobile station for a predetermined time period; when the base transceiver station is involved in the closed loop control, the first reference SIR is increased by a predetermined increase amount; and when the base transceiver station is not involved in the closed loop control, the first reference SIR is not changed.

14. A CDMA (Code Division Multiple Access) mobile communications system comprising:
   a network controller;
   a plurality of base transceiver stations; and
   a plurality of mobile stations,
   wherein the network controller receives a frame of data received by each of the base transceiver stations from the mobile station, selects a frame of data having best condition among a plurality of frames of data received by the base transceiver stations, counts the number of times a frame of data having best condition has not been selected for a predetermined time period to produce a non-selection count for each of the base transceiver stations, selects a first base transceiver station having a non-selection count which is not smaller than a predetermined count threshold, and sends a non-selection notification to the first base transceiver station, and
   each of the base transceiver stations connected to the mobile station, determines whether the non-selection notification is received from the network controller, determines whether a radio channel used to communicate with the mobile station has sufficient communication quality, decreases the reference SIR by a predetermined decrease amount when the radio channel has sufficient communication quality, determining whether the base transceiver station is involved in the closed loop control controlling transmission power of the mobile station, depending on whether the non-selection notification has been received from the network controller when the radio channel has insufficient communication quality, increasing the first reference SIR by a predetermined increase amount when the base transceiver station is involved in the closed loop control, and causing the first reference SIR not to be changed when the base transceiver station is not involved in the closed loop control.

15. A CDMA (Code Division Multiple Access) mobile communication system comprising:
   a network controller;
   a plurality of base stations; and
   a plurality of mobile stations,
   wherein the network controller inquires the reference SIR from each of the plurality of base transceiver stations, selects a minimum reference SIR among a plurality of reference SIRs received from the base transceiver stations, and sends the minimum reference SIR to the base transceiver stations, and
   each of the base stations receiving the minimum reference SIR from the network controller, replaces a current reference SIR with the minimum reference SIR received from the network controller.

* * * * *